US010749969B2

(12) United States Patent
Thomée

(10) Patent No.: US 10,749,969 B2
(45) Date of Patent: Aug. 18, 2020

(54) CONTENT PRESENTATION USING A DEVICE SET

(71) Applicant: Yahoo!, Inc., Sunnyvale, CA (US)

(72) Inventor: Bart Thomée, San Francisco, CA (US)

(73) Assignee: Oath Inc., New York, NY (US)

( * ) Notice: Subject to any disclaimer, the term of this patent is extended or adjusted under 35 U.S.C. 154(b) by 223 days.

(21) Appl. No.: 15/170,249

(22) Filed: Jun. 1, 2016

(65) Prior Publication Data
US 2017/0187811 A1    Jun. 29, 2017

Related U.S. Application Data

(63) Continuation-in-part of application No. 14/982,136, filed on Dec. 29, 2015.

(51) Int. Cl.
*H04L 29/08* (2006.01)
*H04L 29/06* (2006.01)
*H04N 21/45* (2011.01)

(52) U.S. Cl.
CPC ........ *H04L 67/148* (2013.01); *H04L 65/4069* (2013.01); *H04L 65/4084* (2013.01); *H04L 67/141* (2013.01); *H04L 67/303* (2013.01); *H04N 21/4516* (2013.01)

(58) Field of Classification Search
CPC . H04L 65/4069; H04L 65/4084; H04L 65/80; H04L 67/10; H04L 67/141; H04L 67/148; H04L 67/30; H04L 67/303; H04N 21/442; H04N 21/44227; H04N 21/4516; H04N 21/4882; H04W 8/005
See application file for complete search history.

(56) References Cited

U.S. PATENT DOCUMENTS

| 2007/0094366 | A1* | 4/2007 | Ayoub | H04L 65/80 709/223 |
| 2009/0325642 | A1* | 12/2009 | Schuler | G06F 3/1454 455/566 |
| 2011/0138064 | A1* | 6/2011 | Rieger | G06F 17/30905 709/228 |
| 2012/0221662 | A1* | 8/2012 | Yasukawa | H04L 65/80 709/206 |
| 2013/0031217 | A1* | 1/2013 | Rajapakse | H04L 65/4076 709/219 |

(Continued)

*Primary Examiner* — Vivek Srivastava
*Assistant Examiner* — William C McBeth
(74) *Attorney, Agent, or Firm* — Cooper Legal Group, LLC

(57) ABSTRACT

When a user of a device set requests a presentation of a content item, the presentation is often carried out on the device with which the user initiated the request, or a different device that the user specifically chooses. The resulting presentation may exhibit lower quality than if the content item were presented using a different device of the device set, but the user may be unaware of the relative merits of the devices, or unwilling to perform the actions to transfer the presentation to a different device. Instead, an automated comparison of the device properties of the devices with the content properties of the content item may inform an automated identification, and recommendation to the user, of an alternative device that is more suitable for presenting the content item. If the user accepts the recommendation, the presentation of the content item may be transferred to the recommended device.

10 Claims, 15 Drawing Sheets

(56) References Cited

U.S. PATENT DOCUMENTS

| | | | |
|---|---|---|---|
| 2013/0204967 A1* | 8/2013 | Seo | H04L 67/303 709/217 |
| 2013/0262536 A1* | 10/2013 | Avrahami | H04N 21/4516 707/827 |
| 2014/0006496 A1* | 1/2014 | Dearman | H04L 67/303 709/204 |
| 2014/0006947 A1* | 1/2014 | Garmark | H04L 65/4084 715/716 |
| 2014/0106815 A1* | 4/2014 | Sako | H04M 1/7253 455/556.1 |
| 2014/0223503 A1* | 8/2014 | Govande | H04N 21/44227 725/116 |
| 2014/0344848 A1* | 11/2014 | Busse | H04N 21/44227 725/28 |
| 2015/0120953 A1* | 4/2015 | Crowe | H04L 65/4076 709/231 |
| 2015/0296033 A1* | 10/2015 | Jung | H04L 65/4069 709/217 |
| 2016/0150011 A1* | 5/2016 | Le Nerriec | H04N 21/4307 709/205 |
| 2016/0179455 A1* | 6/2016 | Liu | H04L 67/20 345/2.2 |
| 2016/0226956 A1* | 8/2016 | Hong | H04N 21/44218 |
| 2017/0026686 A1* | 1/2017 | Glazier | H04N 21/4307 |
| 2017/0289629 A1* | 10/2017 | Zhou | H04L 29/06 |

* cited by examiner

CONTENT PRESENTATION USING A DEVICE SET

CROSS-REFERENCE TO RELATED APPLICATIONS

This application is a continuation-in-part of, and claims priority under 35 U.S.C. § 120 to, U.S. patent application Ser. No. 14/982,136, titled "CONTENT PREFETCHING AND CACHE MANAGEMENT," filed on Dec. 29, 2015, which is incorporated herein by reference.

BACKGROUND

Within the field of computing, many scenarios involve a content system that presents content items to one or more users, such as images, audio, video, and text. The content items may be presented by insertion into a hosting item, such as a video that is inserted into a content position within a document that is retrieved from a document source, such as a web page retrieved from a webserver.

In many such scenarios, the user may utilize a device set comprising several devices, such as a mobile phone, a tablet, a laptop computer, a desktop computer, and a television. The user may operate each device in a selected set of conditions (e.g., using the mobile phone in transit; using the laptop computer while working in an office or classroom; and using the television while at home). The user may also use each device selectively for a particular type of content (e.g., using the tablet to view literature; using the laptop computer to view web pages; and using the television to view traditional video content).

At times, the user may choose to use such devices interchangeably or in cooperation (e.g., viewing a particular web page on either the mobile phone or the laptop computer, including choosing to transfer the view of a web page from a first device to a second device). In some cases, the devices may promote the transfer of content (e.g., a computer storing a music library may synchronize music data to a mobile device) in order to facilitate access to such content by the user.

SUMMARY

In such scenarios, the presentation of a selected content item is typically achieved based by the device that the user is currently using. For example, when the user is viewing web pages on a mobile phone and selects a particular video, the mobile phone promptly displays the video for the user. The user may also choose to use a different device to view the content item, such as preferring to view the video on a large-display television rather than the mobile phone, and may therefore specifically designate the television as the selected device for viewing the content item.

However, in such scenarios, the presentation of the content item on the device that the user happens to be using may be suboptimal, resulting in a lower presentation quality than if a different device of the device set were used. The user may be unaware of the relative advantages of viewing the content on different devices, or may settle for the current device as a matter of convenience. Alternatively, even if the user is motivated to transfer the presentation of a content item to a different device, the user may choose incorrectly (e.g., based on a misunderstanding of the devices); may be frustrated with the results (e.g., choosing to view the content item on a device that is incapable of presenting it, and being frustrated with error messages or failure); or, if the preferred device is not currently available, may simply forget to do so.

Presented herein are techniques for facilitating the user in viewing content items through the devices of a device set. In accordance with these techniques, when the user of the device set selects a content item for presentation, an automated comparison is performed of the device properties of the various devices with the content properties of the content. This comparison informs an automated identification of a selected device of the device set upon that may achieve a desirable presentation of the content item. If such comparison results in the identification of an alternative device of the device set than the user is currently using, a recommendation may be presented to the user to use the alternative device to view the content item rather than the current device. The recommendation may be presented as a set of options, such that the user may choose to proceed with viewing the content item on the current device, or to transfer the presentation to the recommended device. If the user accepts the recommendation, a transfer of the content item from the current device to the recommended device may be invoked (e.g., transmitting a request to the recommended device to retrieve the content item, and either to begin the presentation promptly or to store the content item for availability at a later time). In this manner, an automated evaluation of the device set may facilitate the user in receiving an optimal presentation of the content item, and may do so with reduced reliance upon the user's actions to initiate and achieve such presentation, in accordance with the techniques presented herein.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Computing Scenarios

The following provides a discussion of some types of computing scenarios in which the disclosed subject matter may be utilized and/or implemented.

1.1. Networking

Figure 1:
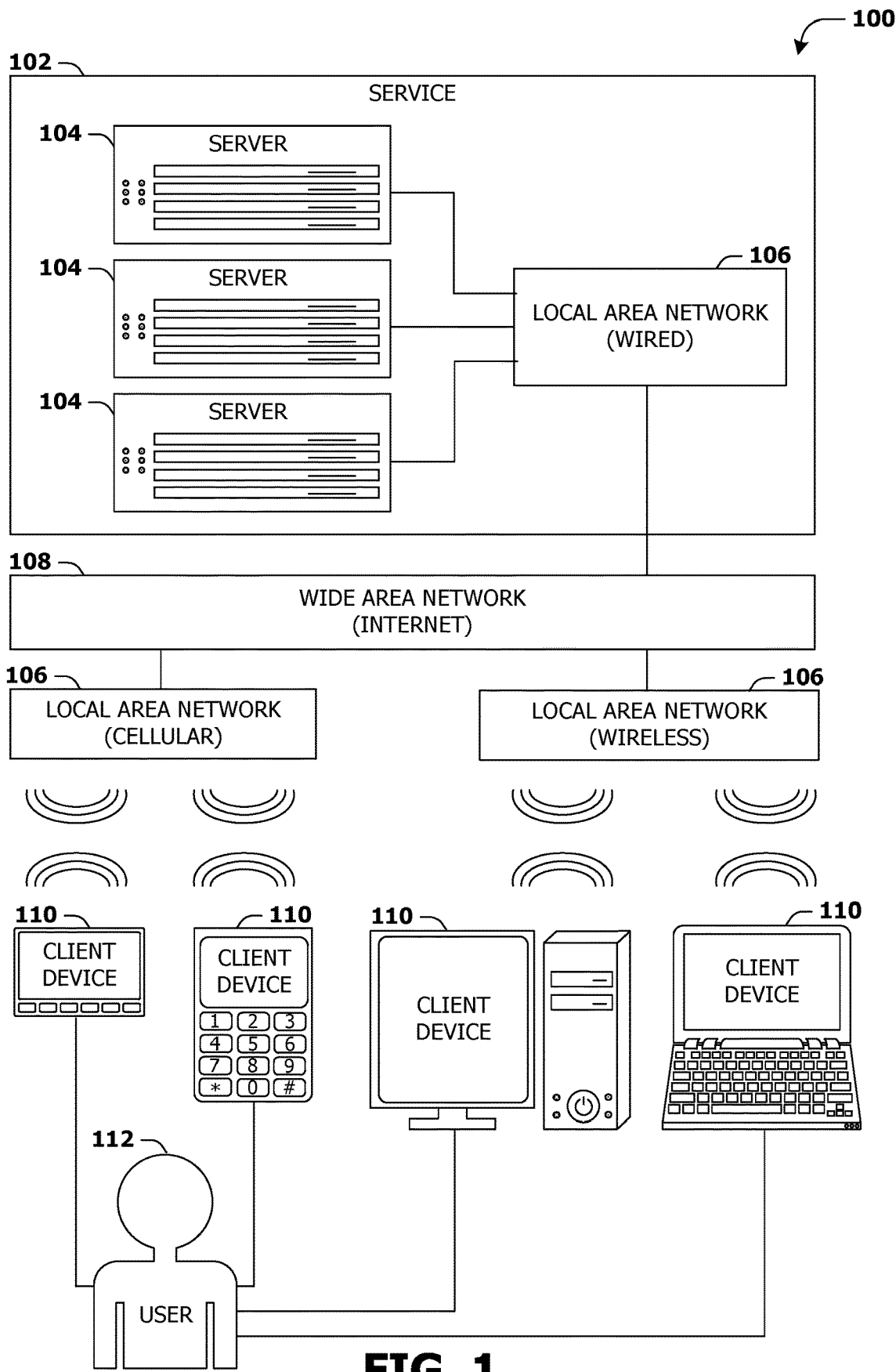
FIG. 1 is an illustration of a scenario involving various examples of networks that may connect servers and clients.

FIG. 1 is an interaction diagram of a scenario 100 illustrating a service 102 provided by a set of servers 104 to a set of devices 110 via various types of networks. The servers 104 and/or devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may also be interconnected directly, or through one or more other networking devices, such as routers, switches, and repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may also include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and mesh architectures, and/or also a variety of roles, such as administrative servers, authentication servers, security monitor servers, data stores for objects such as files and databases, business logic servers, time synchronization servers, and front-end servers providing a user-facing interface to the service 102.

Likewise, the local area network 106 may comprise one or more sub-networks, such as may employ differing architectures or may be compliant or compatible with differing protocols, may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and devices 110. The wide area network 108 may encompass various combinations of devices with varying levels of distribution and exposure, such as a public wide-area network (e.g., the Internet), or a private network (e.g., a virtual private network (VPN) of a distributed enterprise).

In the scenario 100 of FIG. 1, the service 102 may be accessed via the wide area network 108 by a user 112 of a set of devices 110, such as a portable media player (e.g., an electronic text reader, an audio device, or a portable gaming, exercise, or navigation device); a portable communication device (e.g., a camera, a phone, or a text chatting device); a workstation; and a laptop form factor computer. The respective devices 110 may communicate with the service 102 via various connections to the wide area network 108. As a first such example, one or more devices 110 may comprise a cellular communicator, and may connect to the wide area network 108 via a wireless local area network 106 provided by a cellular provider. As a second such example, one or more devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the devices 110 may communicate over various types of networks. Other types of networks that may be accessed by the servers 104 and/or devices 110 include mass storage, such as network attached storage (NAS), a storage area network (SAN), or other forms of computer or machine readable media.

1.2. Server Configuration

Figure 2:
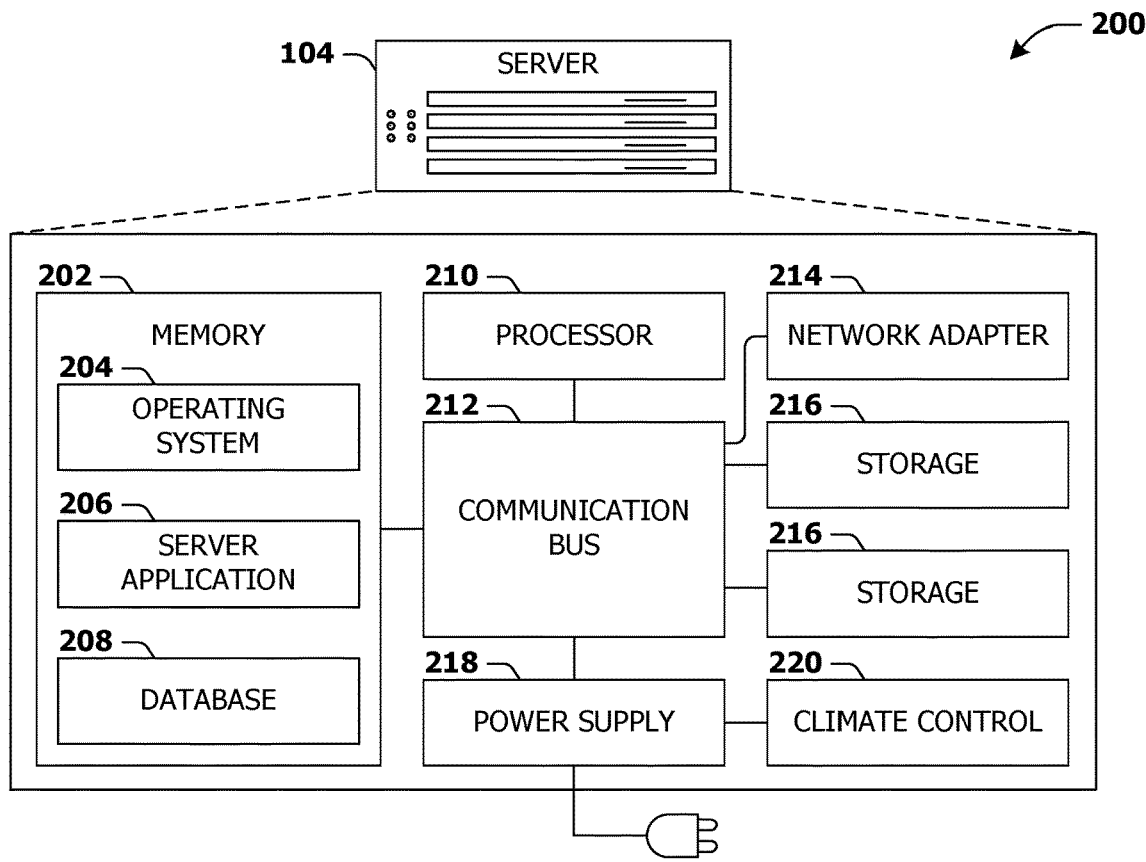
FIG. 2 is an illustration of a scenario involving an example configuration of a server that may utilize at least a portion of the techniques presented herein.

FIG. 2 presents a schematic architecture diagram 200 of a server 104 that may utilize at least a portion of the techniques provided herein. Such servers 104 may vary widely in configuration or capabilities, alone or in conjunction with other servers 104, in order to provide a service 102.

A server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A server 104 may also comprise a memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may also comprise a variety of peripheral components, such as a wired and/or wireless network adapter 214 connectible to a local area network 106 and/or wide area network 108; one or more storage components 216, such as a hard disk drive, a solid-state storage device (SSD), a flash memory device, and/or a magnetic and/or optical disk reader. The server 104 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. In a multibus scenario, a communication bus 212 may interconnect the server 104 with at least one other server 104. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

A server 104 may also operate in various physical enclosures, such as a desktop or tower, and/or may be integrated with a display as an "all-in-one" device. A server 104 may also be mounted horizontally and/or in a cabinet or rack, and/or may simply comprise an interconnected set of components. A server 104 may also comprise a dedicated and/or shared power supply 218 that supplies and regulates power for the other components. The server 104 may also provide power to and/or receive power from another server 104 and/or other devices. The server 104 may also comprise a shared and/or dedicated climate control unit 220 that regulates climate properties, such as temperature, humidity, and airflow. Many such servers 104 may be configured and/or adapted to utilize at least a portion of the techniques presented herein.

1.3. Device Configuration

Figure 3:
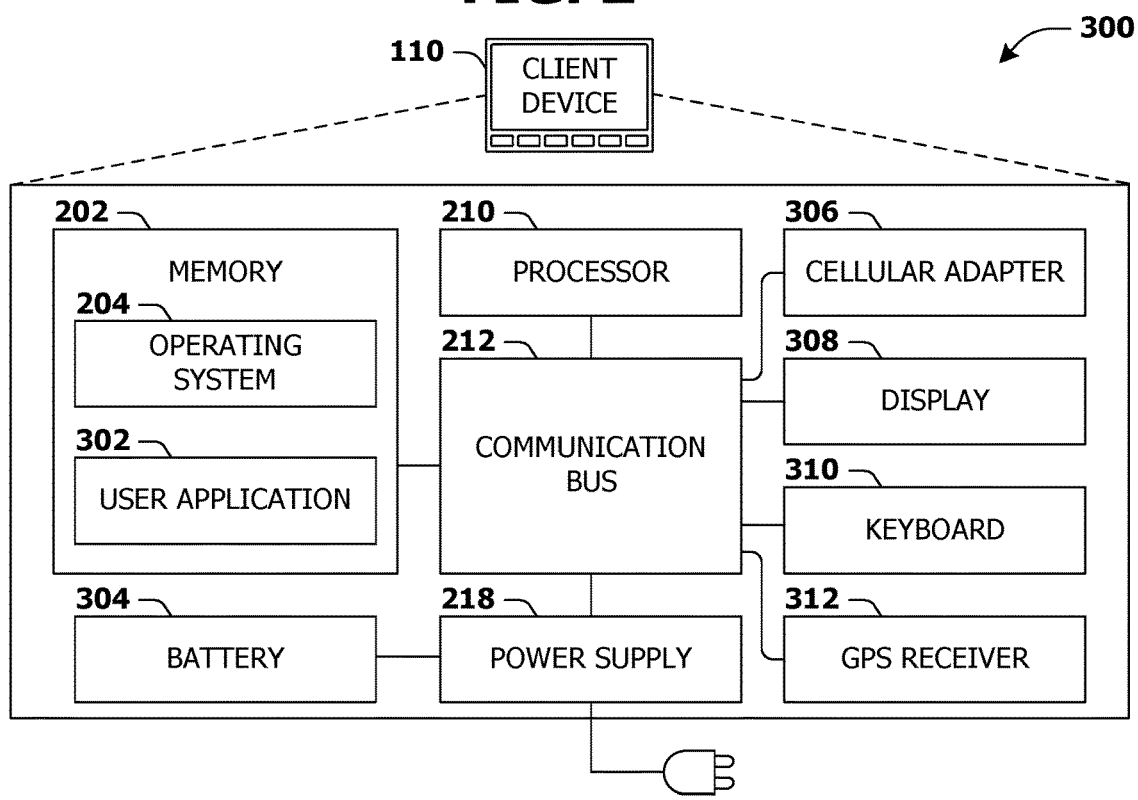
FIG. 3 is an illustration of a scenario involving an example configuration of a client device that may utilize at least a portion of the techniques presented herein.

FIG. 3 presents a schematic architecture diagram 300 of a device 110 operable by a user 112, whereupon at least a portion of the techniques presented herein may be implemented. Such devices 110 may vary widely in configuration or capabilities, in order to provide a variety of functionality to the user 112. A device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and a component of a piece of furniture, such as a tabletop, and/or of another device, such as a vehicle or residence. A device 110 may also serve the user 112 in a variety of roles, such as a workstation, kiosk, media player, gaming device, and/or appliance.

A device 110 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A device 110 may also comprise a memory 202 storing various forms of applications, such as an operating system 204; one or more user applications 302, such as document applications, media applications, file and data access applications, communication applications such as web browsers and email clients, utilities, and games; and drivers for various peripherals. A device 110 may also comprise a variety of peripheral components, such as a wired and/or wireless network adapter 214 connectible to a local area network 106 and/or wide area network 108; one or more output components, such as a display 308 coupled with a display adapter (optionally including a graphical processing unit (GPU)), a sound adapter coupled with a speaker, and a printer; input devices for receiving input from the user 112, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the device 110, and/or an compass, accelerometer, and/or gyroscope that detects a physical orientation of the device 110. Other components that may optionally be included with the device 110 (though not shown in the schematic diagram 300 of FIG. 3) include one or more storage components 216, such as a hard disk drive, a solid-state storage device (SSD), a flash memory device, and/or a magnetic and/or optical disk reader; and/or a flash memory device that may store a basic input/output system (BIOS) routine that facilitates booting the device 110 to a state of readiness; and a climate control unit that regulates climate properties, such as temperature, humidity, and airflow.

A device 110 may comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. A device 110 may also comprise a dedicated and/or shared power supply 218 that supplies and regulates power for the other components, and/or a battery 304 that stores power for use while the device 110 is not connected to a power source via the power supply 218. The device 110 may also provide power to and/or receive power from other devices 110.

In some scenarios, as a user 112 interacts with a software application on a device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user 112 via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The device 110 may also include one or more servers that may locally serve the device 110 and/or other devices 110 of the user 112 and other individuals. For example, a locally installed webserver may provide web content in response to locally submitted web requests. Many such devices 110 may be configured and/or adapted to utilize at least a portion of the techniques presented herein.

1.4. Selection and Delivery of Content Items

Figure 4:
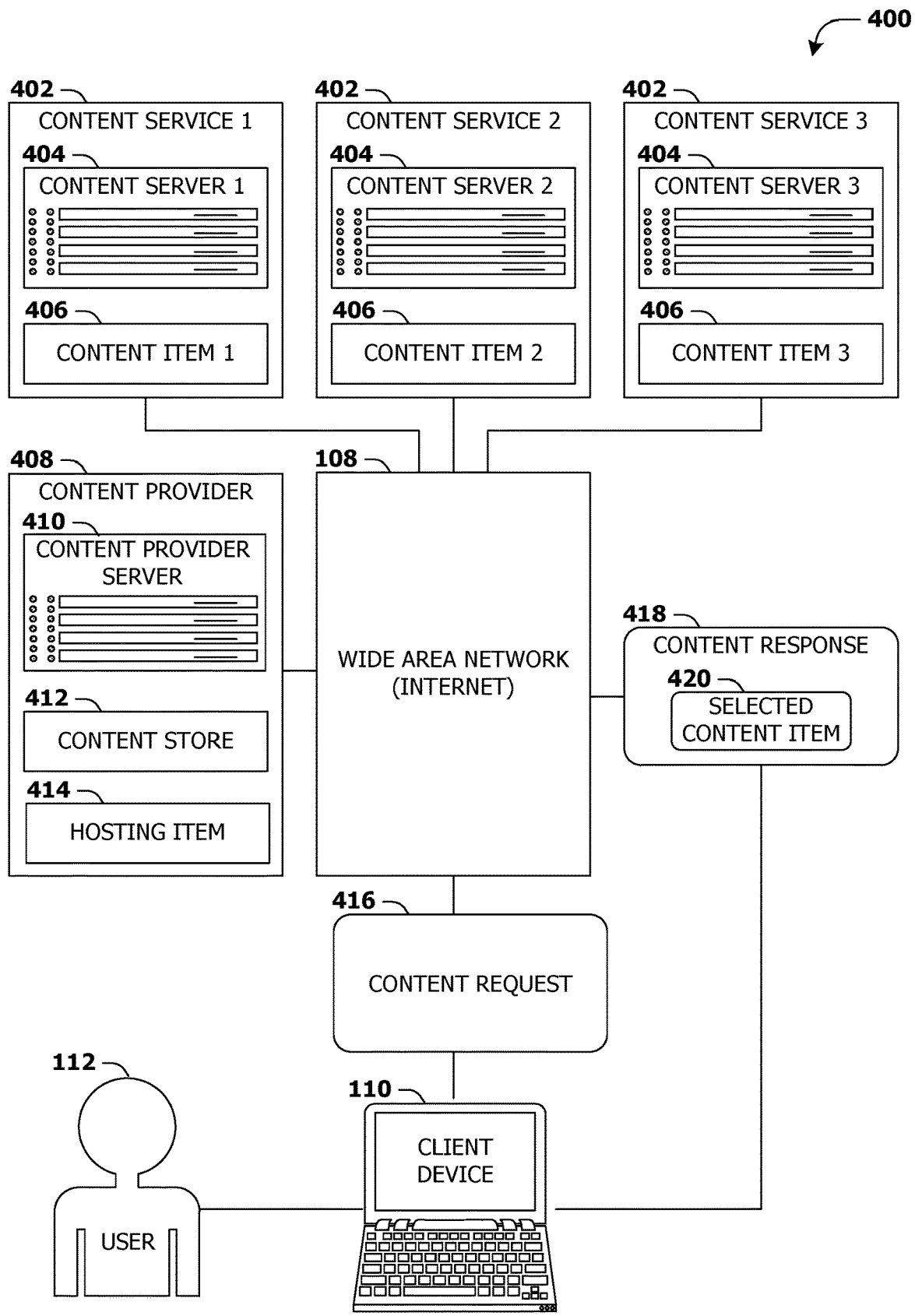
FIG. 4 is an illustration of a scenario involving a retrieval of content provided by a content delivery network (CDN) for presentation to a user.

FIG. 4 is an interaction diagram of a scenario 400 featuring a content delivery network, also sometimes referred to as a content distribution network or CDN. These terms generally refer to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

In the scenario 400 of FIG. 4, a set of content services 402 respectively comprise a content server 404 that provides access to a set of content items 406, such as text articles, pictures, video, audio, applications, data files, and output from devices such as cameras. A content provider 408 is provided, comprising a content provider server 410 that interacts with the content services 402 over a wide area network 108, such as the Internet, to index the content items 406 provided thereby. For example, the content provider server 410 may utilize a content crawler that iteratively explores the content services 402 and generates a content store 412, e.g., a collection of the content items 406 or references thereto, and/or a content index that enables rapid identification of particular content items 406. The content provider 408 may be deployed in a distributed manner across at least two content provider servers 410, which may be organized by role (e.g., a first content provider server 410 maintaining the content index 414, and a content provider server 410 interacting with users 112 and/or devices 110) and/or geographically (e.g., various content provider servers 410 may be provided to service devices 110 in different physical locations). Components may be duplicated within the content provider 408; e.g., two or more content provider servers 410 may be provided to facilitate the reliability, response time, and/or scalability of the content provider 408.

As further illustrated in the scenario 400 of FIG. 4, a user 112 of a device 110 may engage in an interaction with the content provider 408 and/or content services 402 in the following manner. The device 110 may present a request for content hosted by the content provider 408, such as a web page identified by a uniform resource location (URL). In response, the content provider 408 may transmit a content response 416 that includes the content item 406, optionally embedded within a hosting item 414, such as a video that is embedded within a web page. The content item 406 may be selected by the content provider 408 from the content store 412, and the content provider 408 may provide the requested content item 406 and the hosting item 414 as a source document, such as text with HTML markup, that includes a hyperlink element including a URL that references the content item 406 from one of the content service 402 to be inserted in the layout of the rendered document. While rendering the HTML document, the device 110 may identify the URL within the hyperlink, retrieve the referenced content item from the hosting content service 402, and insert the retrieved content item at the content position 418 in the layout of the hosting item 414. Using this "on-demand" model, the device 110 retrieves the selected content item 420 in response to the request by the user 112 for the hosting item 414, and thereby achieves the presentation of the selected content item 420 to fulfill the request of the user 112.

1.5. Presentation of Content Items Using a Device Set

Figure 5:
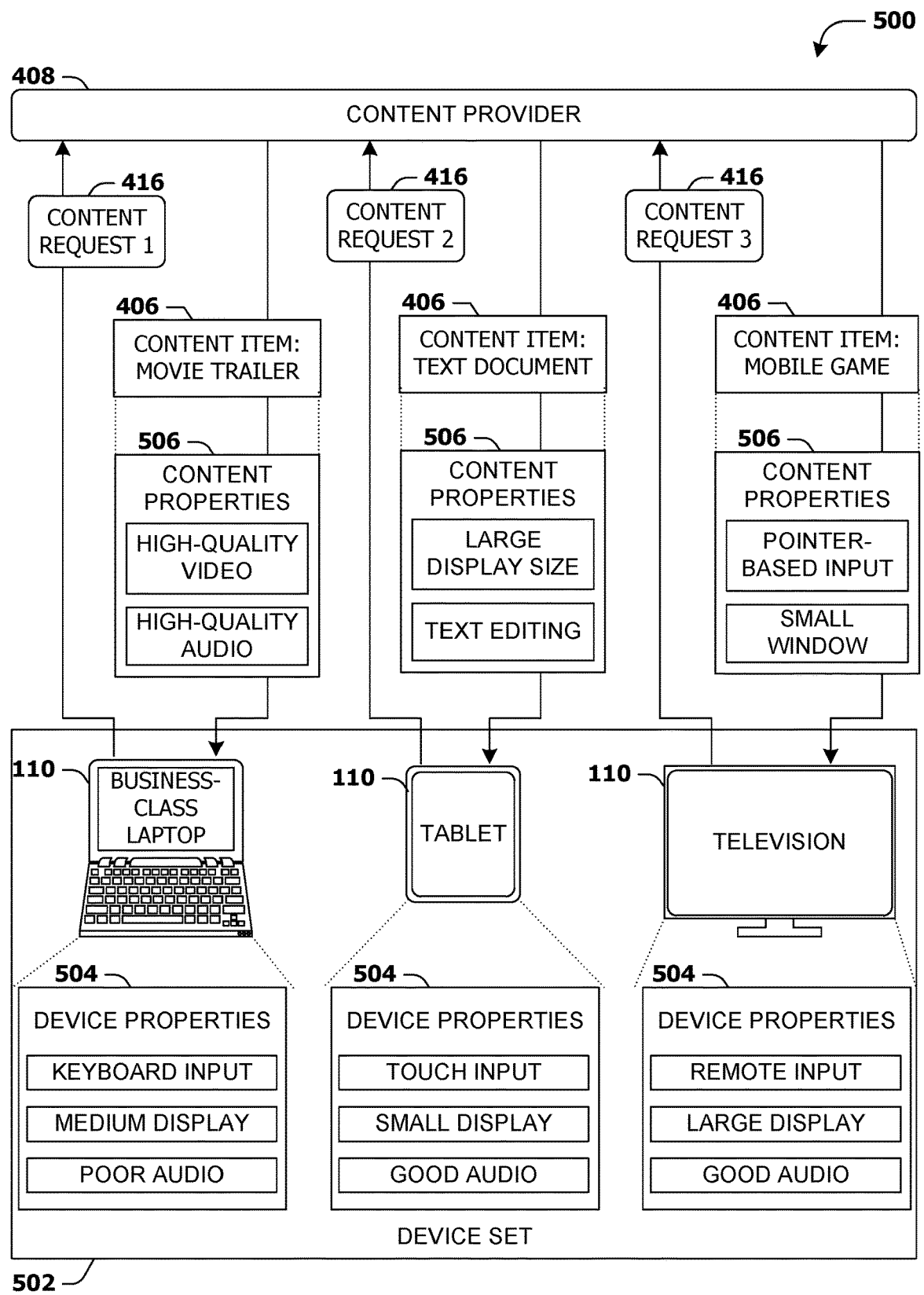
FIG. 5 is an illustration of a scenario involving the presentation of various content items to a user of a device set.

FIG. 5 is an illustration of an example scenario featuring the presentation of content items 406 provided by a content provider 408 using a device set 502 of various devices 110.

In this example scenario 500, a user 112 utilizes a device set 502 of devices 110, including a business-class laptop; a portable tablet; and a television. The user 112 may interact with each device 110 individually, and, occasionally, may concurrently utilize two or more devices. Occasionally, while currently using one such device 110, the user 112 may initiate a content request 416 for a content item 406 to be presented using the current device 110, e.g., by clicking on a hyperlink in a web page presented within a web browser of the current device 110. Accordingly, the current device 110 may issue a content request 416 to the content provider 408, which may respond by transmitting the selected content item 406 to the current device 110, which may fulfill the request by presenting the received content item 406 to the user 112.

More particularly, while using each such device 110 the user 112 may request a particular content item 406 that is then presented on the same device 110. For example, while using the business-class laptop, the user may initiate a content request 416 to view a movie trailer, and may then view the movie trailer on the business-class laptop during or after the content provider 408 transmits the content item 406 to the business-class laptop. Similarly, while using the tablet, the user may initiate a content request 416 to view an editable text document, which is then received by and presented on the tablet; and while using the television, the user 112 may initiate a content request 416 to view a game that is intended for use on mobile devices, which is then received by and presented on the television. In this manner, the user 112 may view the content items 406 on the respective device 110 through which the user 112 initiated the content request 416.

However, in this example scenario 500, some limitations and disadvantages may arise in the presentation of content items 406 using the particular device 110 through which the content request 416 was initiated. As a first such example, displaying the movie trailer content item 406 on the business-class laptop 110 may result in a poor-quality presentation, because the movie trailer may exhibit content properties 506 including high-quality video and high-quality audio, but the business-class laptop may feature device properties 504 including a medium-quality display and poor-quality speakers. As a result, the video of the movie trailer may appear of diminished quality, and/or the video may have to be downscaled in resolution, color depth, frame rate, and/or bitrate for presentation. A commodity processor may struggle to render a high-bitrate movie trailer in realtime, resulting in frequent stutter and a very dissatisfying presentation. In some cases, it may not even be possible to view the movie trailer content item 406 appropriately on the business-class laptop; e.g., the business-class laptop may not feature a suitable codec for the movie trailer, and the content request 416 may result in an error message. These poor-quality results may be particularly disappointing when compared with the experience of viewing the same movie trailer content item 406 on the television device 110, which may feature a large display and high-quality audio components that are well-suited to the content item 406.

Similarly disappointing results may be similarly incurred by the other content requests 416. In a second such example, the content request 416 for the text document content item 406 may result in its presentation on the tablet 110 through which the content request 416 was initiated. However, the tablet 110 may feature a touch input (e.g., an on-screen keyboard) and a small display, which may be unsuitable for the content properties 506 of the text document content item 406, which is typically viewed in a large display size (e.g., an entire page of content at a time) and/or with text editing capabilities to which the touch input of the tablet 110 is not well-suited. By contrast, the device properties 405 of the business-class laptop 110, including a keyboard input device and a medium-sized display, may be well-adapted for viewing and editing the text document content item 406. As a third such example, the presentation of the mobile game content item 406 may produce poor results using the television device 110, since the mobile game may feature a content property 506 of pointer-based input that is tedious to perform using the device property 504 comprising a directional remote control input of the television 110, and/or the small window content property 506 (e.g., video output that is formatted and intended for a small-display mobile device) may look pixelated and blocky if scaled up to the large, high-resolution display device property 504 of the television device 110. Alternatively, using the tablet 110 (featuring device properties 504 including touch input and a small display size) may be well-adapted for the content properties 506 of the content item 406.

It may be appreciated that such disadvantages arise, in part, because the presentation of content on various devices 110 is often driven by the request of the user 112. That is, among the devices of the device set, the particular device 110 upon which a selected content item 416 is presented is typically determined by whichever device 110 the user 112 is using at the time of the request (e.g., a content item 406 is presented on the mobile phone simply because the user 112 initiated the request to view the web page through the web browser of the mobile phone).

It may therefore be appreciated that in many such instances, the selection of the device 110 is driven arbitrarily by extraneous factors such as happenstance or convenience, causing the resulting mismatch of the requested content item 406 and the device 110 used to present the content item 406. For example, the user 112 may first learn of the existence and/or accessibility of a particular content item 406 while utilizing a mobile phone, but choosing the mobile phone as the device 110 of the device set 502 for viewing that particular content item 406 may result in a lower-quality experience than using another device 110 of the device set 502. The user 112 may not realize the alternative option (e.g., the user 112 may be unaware of the content properties 506 of a newly encountered content item 406, and/or the user 112 may be unaware of the comparative device capabilities 504 of the devices 110 of the device set 502). Even if the user 112 understands the relative advantages of viewing a particular content item 406 on various devices 110 of the device set 502, it may not occur to the user 112 to do so. Alternatively, the user 112 may deliberately choose not to bother transferring the presentation of the content item 406 to a different device 110 if such transfer is perceived as inconvenient or inconsequential (e.g., the user 112 may settle for a lower-quality presentation on a current device 110 simply as a matter of convenience).

Other complications may arise when the user 112 deliberately chooses and utilizes a device 110 for the presentation of a particular content item 406. As a first such example, the user 112 may misunderstand the relative device capabilities 504 of each device 110 and the relative advantages of viewing a selected content item on the respective devices 110, and such choice may produce a suboptimal result. For example, in order to view a video content item 406 featuring a high-quality video content property 506, the user 112 may incorrectly choose a larger but lower-resolution laptop display to view a content item, rather than a higher-resolution display of a portable tablet). As a second such example, the user 112 may not fully understand the capabilities of each device 110, and, upon opting to view a content item 406 on a mobile phone instead of a laptop, may be frustrated to encounter an error indicating that the mobile phone is incapable of rendering the content item 406, even though the laptop may be fully capable of such presentation. As a third such example, the user 112 may choose to defer viewing the content item 406 on a current device 110 (such as a mobile phone used during transit) in favor viewing the same content item 406 later using a different device 110 (e.g., viewing the content item 406 upon arriving home), but may fail to remember to do so.

Moreover, even if the user 112 succeeds in acting to initiate the content item 406 using an alternative device 110, the interaction involved between the user 112 and the devices 110 of the device set 502 may be frustrating or onerous (e.g., the user 112 may have to initiate transfer of the content item 406 from the current device 110 to the alternate device 110; to monitor the transfer until completion; to initiate the presentation on the alternate device 110; and to stop and/or remove the content item 406 from the current device 110). These and many other disadvantage may arise from an initially arbitrary selection among the devices 110 of the device set 502 for the presentation of content items 406, and the dependency of an alternative presentation upon the deliberate, informed, and manual interaction between the user 112 and the devices 110 of the device set 502.

2. Presented Techniques

Figure 6:
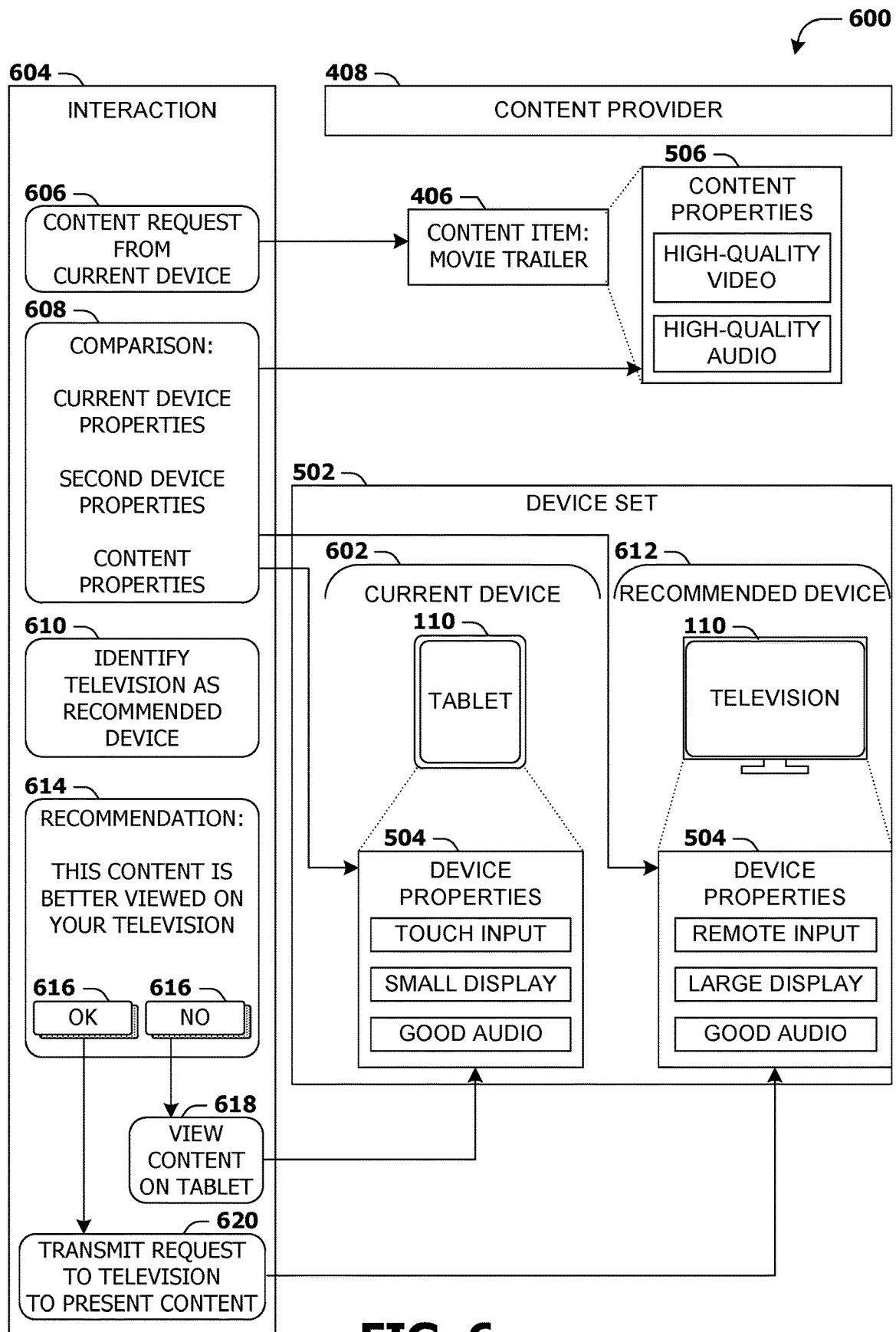
FIG. 6 is an illustration of an alternative scenario involving the presentation of various content items to a user of a device set, in accordance with the techniques presented herein.

FIG. 6 is an illustration of a scenario 600 involving alternative techniques for achieving a presentation of content items 406 using a device set 502 in accordance with the techniques presented herein.

In this example scenario 600, a user 112 who is currently operating a tablet device 110 of the device set 502 initiates a request for a content item 406 from a content provider 408, and the request is fulfilled through the following interaction 604. First, the content request 606 from the current device 602 identifies a content item 406 exhibiting a set of content properties 506, such as high-quality video and high-quality audio. Similarly, the respective devices 110 of the device set 502 are associated with a set of device properties 504; e.g., the tablet device 110 features a small display but touch-based input, while the television device 110 features a large display but input via a remote control. An automated comparison 608 is performed between the device properties 504 of the respective devices 110 of the device set 502 and the content properties 506 of the content item 406. The automated comparison 608 informs an identification 610, among the devices 110 of the devices set 502, of a recommended device 612 for viewing the content item 406. In some cases, the recommended device 612 may comprise the current device 602, in which case the presentation of the content item 406 is initiated on the current device 602. In other cases (including the example scenario 600 of FIG. 6), the recommended device 612 so identified may differ from the current device 602. A recommendation 614 may therefore be presented to the user 112 to view the content item 406 on the recommended device 612 instead of the current device 602. The recommendation 614 may include a set of options 616 for acting upon the recommendation 614, where selection of a first option 616 that declines the recommendation 614 may result in a presentation 618 of the content item 406 on the current device 602 as originally (though perhaps tacitly) requested by the user 112. Alternatively, selection of a second option 616 that accepts the recommendation 614 prompts an automated transmission 620 of a request to the recommended device 612 to present the content item 406.

In various embodiments and/or scenarios, the recommended device 612 may promptly retrieve the content item 406 and promptly commence presentation (perhaps in a streaming manner); or the recommended device 612 may retrieve the content item 406 and store the same for presentation to the user 112 at a later time; or the recommended device 612 may simply store a reference to the content item 406, as a reminder that the user 112 expressed an interest in viewing the content item 406 specifically on the recommended device 612. In this manner, the devices 110 of the device set 502 interoperate to present an interaction 604 with the user 112 that facilitates the presentation of the content item 406 in a suitable manner by matching the content item 406 with a well-suited device 110 and presenting a recommendation 614 thereof to the user 112, in accordance with the techniques presented herein.

3. Technical Effect

The techniques presented herein and illustrated in the scenario 600 of FIG. 6 may provide a variety of technical effects for the presentation of content items 406 using the device set 502.

A first technical effect that may be achieved by the techniques presented herein is using the devices 110 of the device set 502 to achieve an advantageous, and perhaps optimal, presentation of a particular content item 406. For example, a movie trailer content item 406 may be more completely appreciated or enjoyed if viewed on a recommended device 612 with device properties 504 that are well-suited to the content item 406, such as a display and audio hardware that enable a full-fidelity rendering of the content properties 506 of the content item 406, than when presented on a different device 110 that is not as well-suited. Such scenarios may include a current device 602 that features devices properties 504 that are too high-quality to achieve a suitable presentation of a content item 406 featuring low-quality content properties 506; e.g., when a low-resolution icon designed for a low-resolution mobile display is presented on a high-resolution display, the device 110 may either use its native resolution (thereby causing the icon to appear very small) or scale up the icon to the higher resolution of the display (thereby introducing scaling artifacts).

A second technical effect that may be achieved by the techniques presented herein is providing a more convenient and user-friendly interaction 604 between the device set 502 and the user 112 to achieve the presentation of the content item 406. Compared with a user-driven process of selecting a recommended device 612 and implementing the transport of the presentation of the content item 406 to the recommended device 110, the interaction 604 depicted in the example scenario 600 of FIG. 6 features an automatically initiated comparison 608 and identification 610 of the recommended device 612, and an easier transport mechanism (e.g., the user 112 only has to review and accept the recommendation 614). A more streamlined and well-designed user interaction 604 correspondingly increases the quality of the user experience and convenience of the engagement of the user 112 with the device set 502. Additionally, the interaction 604 may inform the user 112 of the comparative qualities of the devices 110 (e.g., educating the user 112 as to why the device properties 504 of the television device 110 are better-suited to particular types of content items 406 than the device properties 504 of the tablet device 110, and perhaps vice versa), thereby increasing the user's complete and accurate understanding of the capabilities of respective devices 110 of the device set 502.

A third technical effect that may be achieved by the techniques presented herein is the reduction of errors that may frustrate the user 112 during interaction with the device set 502. For example, a comparison of the device properties 504 of the respective devices 110 with the content properties 506 of a particular content item 406 may enable an automated exclusion, from the identification 610 of the recommended device 612, of a particular device 110 where such presentation is unachievable or unsuitable. As a first example, a device 110 may not feature a codec with which an encoded media object can be decoded, or a commodity-level processor that is incapable of consistently rendering a high-bitrate media object in realtime, leading to stuttering or delays that significantly diminish the presentation of the content item 406. The automated comparison 608 of the device properties 504 and content properties 506 may enable a reduction in the errors and/or unsuitable results that the user 112 may have encountered while manually selecting a device 110 to present the content item 406, thereby raising the perceived convenience and user experience quality of the user while interacting with the device set 502.

A fourth technical effect that may be achieved in some embodiments of the techniques presented herein is the extension of options for presenting a content item 406 to utilize multiple devices 110, and the device properties 504 thereof. For example, in some variations described herein, a multimedia content item 406 may be partitioned into a first media component (such as video) that is presented on a first device 110 of the device set 502, and a second media component (such as audio) that is concurrently presented on a second device 110 of the device set 502. Such combinations of devices 110 in the presentation of a content item 406 may be much more difficult for a user 112 to achieve without automated assistance, and may therefore enable a higher-quality presentation of the content item 406 than if presented using any single device 110 of the device set 502.

A fifth technical effect that may be achieved by the techniques presented herein is that correctly matching a content item 406 with a suitable device 602 may promote the efficient use of resources. For example, a device set 502 may include two portable devices 110 in the possession of the user 112: a tablet device 110 and a mobile phone device 110. Even if both devices 110 feature displays of comparable size and display quality, the device properties 504 of the display on the mobile phone device 110 may match the content properties 506 of the content item 406 (e.g., a 1920×1080-pixel video presented on a 1920×1080-pixel display), while the device properties 504 of the tablet device 110 may not match the content properties 506 (e.g., a 2048×1536-pixel display). Accordingly, presenting the content item 406 on the tablet device 110 may involve resolution scaling of every frame of the video, which consumes additional processing cycles and depletes the power storage of a battery, while presenting the same content item 406 on the resolution-matched mobile phone device 110 avoids such scaling and the resulting depletion of battery life. It may be appreciated that when applied throughout a lengthy presentation, such as a 90-minute feature film, the efficiency difference in the consumption of battery power may be quite significant; indeed, the mobile tablet 110 may not even be able to complete the presentation of the content item 406 due to the inefficiency incurred by such resolution scaling, whereas the mobile phone device 110 may complete such presentation with ample reserve power remaining. Such efficiency tradeoffs may be included in the automated comparison 608, and may become apparent to the user 112 as an extension of the collective battery life of the devices 110 of the device set 502. These and other technical advantages may be exhibited by embodiments of the techniques presented herein.

4. Example Embodiments

Figure 7:
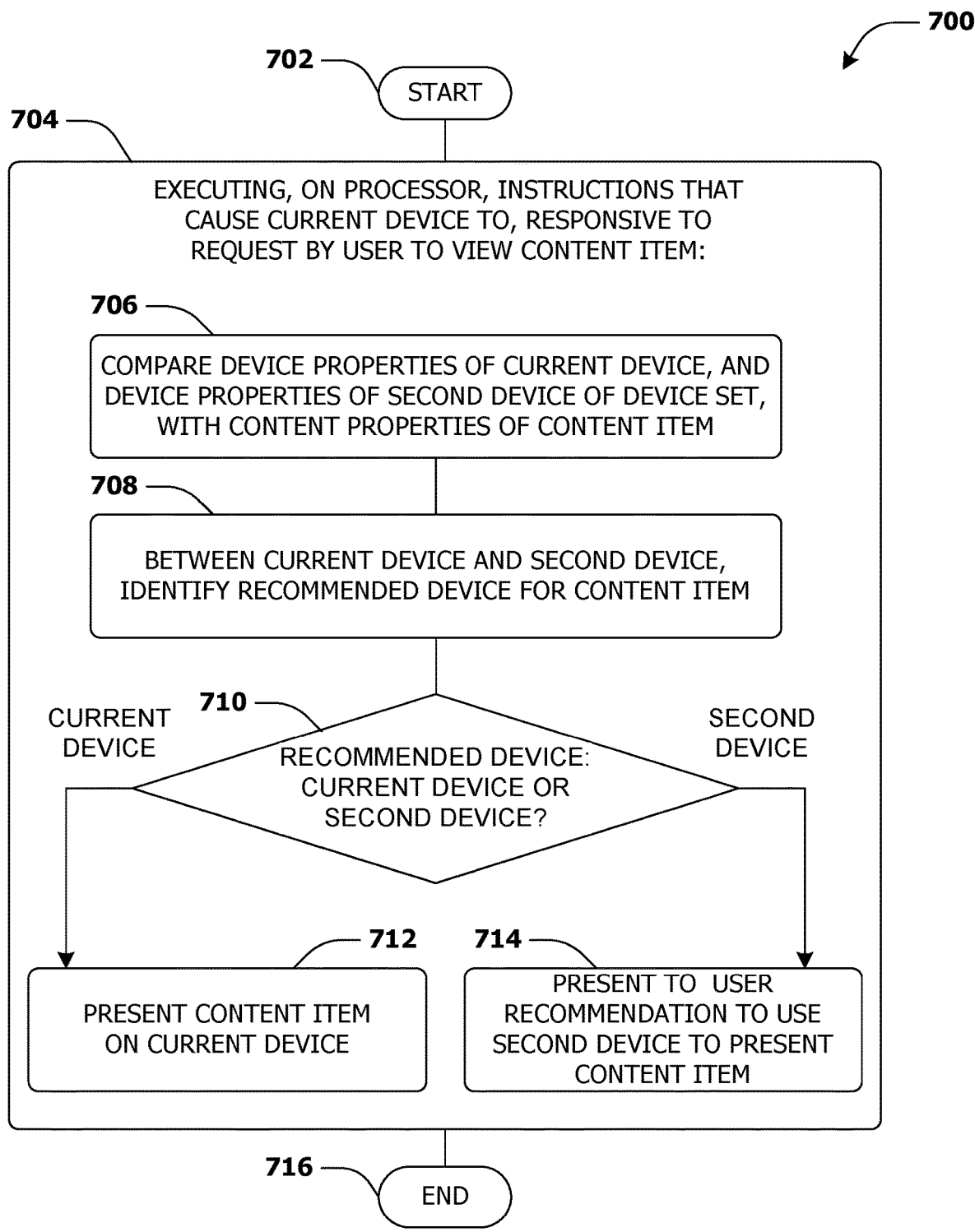
FIG. 7 is an illustration of a first example method of presenting content to a user of a device set, in accordance with the techniques presented herein.

FIG. 7 presents an illustration of a first example embodiment of the techniques presented herein, illustrated as an example method 700 of presenting content to a user 112 of a current device 602 included in a device set 502 featuring at least one other device 110. The example method 700 may be implemented, e.g., as instructions stored in a memory (e.g., a hard disk drive, a solid-state storage device such as a flash memory device, or a magnetic or optical disc) that, when executed on a processor of the current device 602, cause the current device 602 to operate according to at least a portion of the techniques presented herein.

The example method 700 begins at 702 and comprises, responsive to a content request 416 by the user 112 to present a content item 406, executing 704 the instructions on the processor of a current device 110. Specifically, executing the instructions causes the current device 602 to compare 706 device properties 540 of the current device 602 and device properties 504 of the second device 110 of the device set 502 with content properties of the content item. Executing the instructions also causes the current device 602 to, between the current device 110 and the second device 110 of the device set 502, identify 708 a recommended device 612 for presenting the content item 406. The example method 700 then diverges 710 on the basis of whether this identification 708 results in the identification of either the current device 602 or the second device 110 as the recommended device 612 for presenting the content item 406. Executing the instructions also causes the current device 602 to, responsive to identifying 708 the current device 620 as the recommended device 612, present 712 the content item 406 on the current device 602. Alternatively, executing the instructions also causes the current device 602 to, responsive to identifying the second device 110 as the recommended device 612, present 714 to the user 112 a recommendation 614 to use the second device 110 to present the content item 406. In this manner, the example method 700 facilitates the presentation of the content items 406 to the user 112 of the device set 502 in accordance with the techniques presented herein, and so ends at 716.

Figure 8:
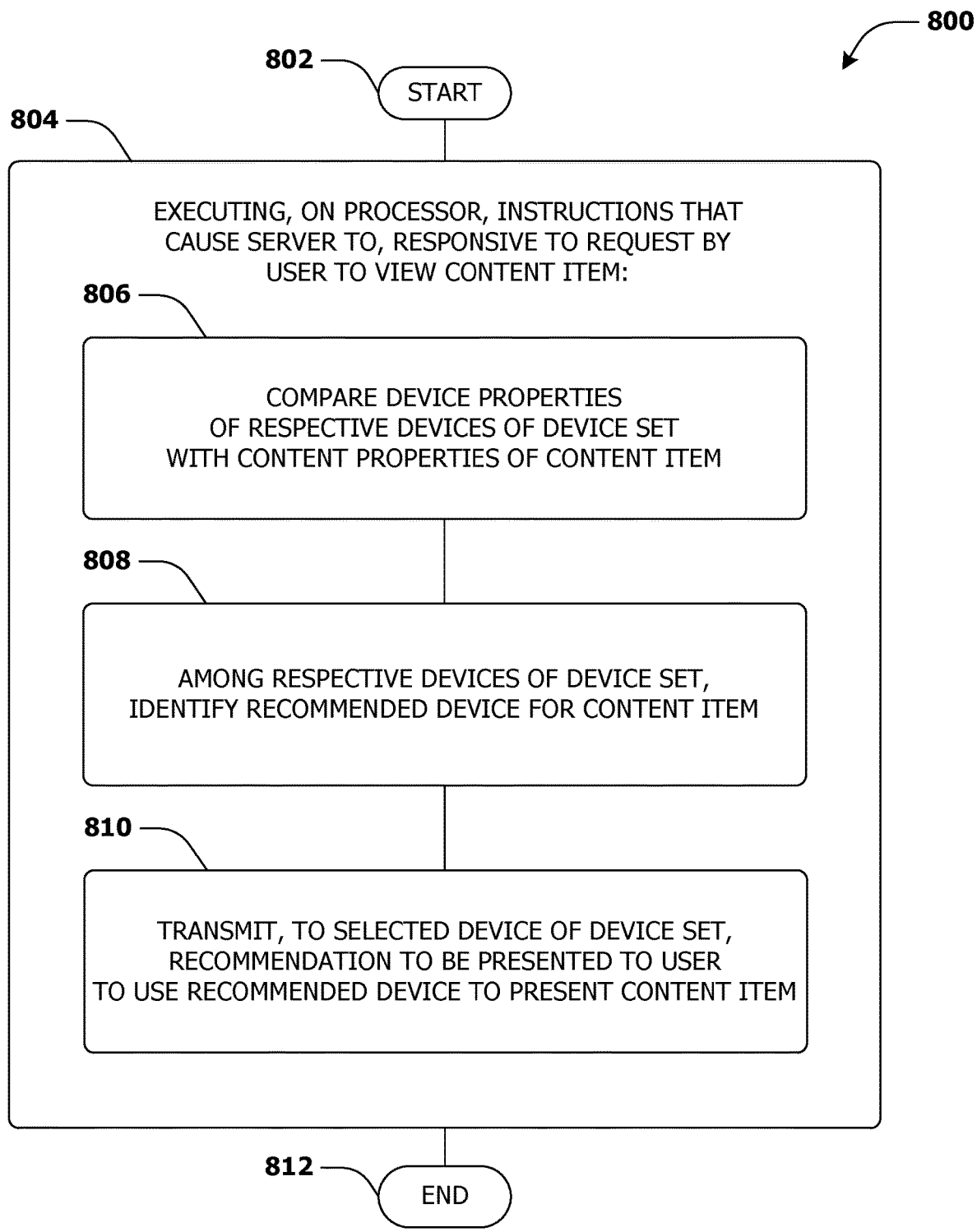
FIG. 8 is an illustration of a second example method of presenting content to a user of a device set, in accordance with the techniques presented herein.

FIG. 8 presents an illustration of a second example embodiment of the techniques presented herein, illustrated as an example method 800 of configuring a server to assist a user 112 of a device set 502 in viewing content. The example method 800 may be implemented, e.g., as instructions stored in a memory (e.g., a hard disk drive, a solid-state storage device such as a flash memory device, or a magnetic or optical disc) that, when executed on a processor of the server, cause the server to operate according to at least a portion of the techniques presented herein.

The example method 800 begins at 802 and comprises, responsive to receiving a content request 416 by the user 112 to view a particular content item 406, executing 804 the instructions on the processor of the server. In particular, executing the instructions causes the server to compare 806 the device properties 504 of respective devices 110 of the device set 502 with the content properties 506 of the content item 406. Executing the instructions also causes the server to, among the respective devices 110 of the device set 502, identify 808 a recommended device 612 for the presentation of the content item 406. Executing the instructions also causes the server to transmit 810, to a selected device 110 of the device set 502 (e.g., the current device 602 through which the content request 416 was initiated by the user 112, and/or the recommended device 612), a recommendation 614, to be presented to the user 112, to use the recommended device 612 to present the content item 406 (possibly in lieu of the current device 602 if the recommended device 612 and the current device 602 differ). In this manner, the example method 800 facilitates the presentation of the content items 406 to the user 112 of the device set 502 in accordance with the techniques presented herein, and so ends at 812.

Figure 9:
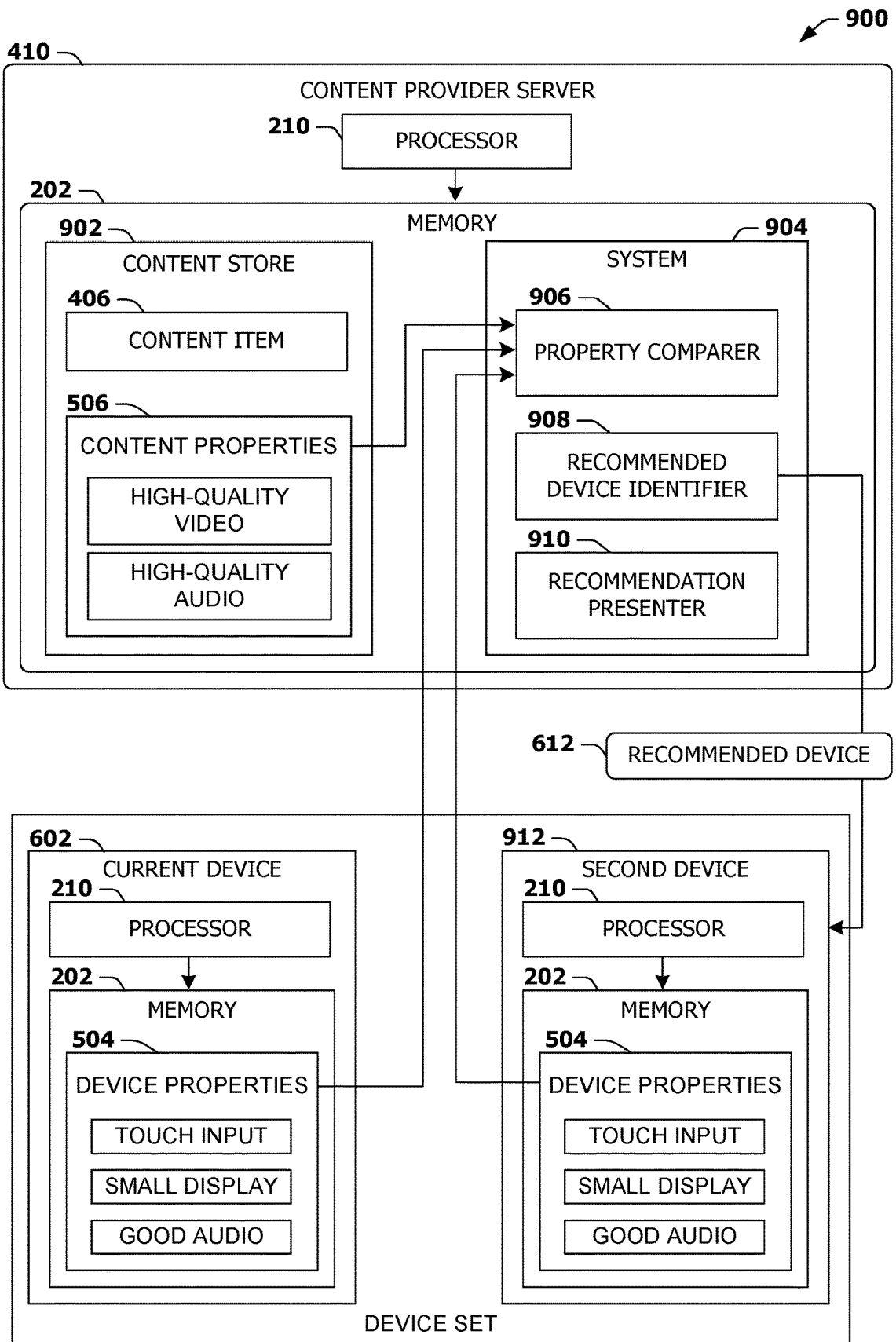
FIG. 9 is an illustration of a scenario featuring an example content provider server that facilitates the presentation of content to a user of a device set, in accordance with the techniques presented herein.

FIG. 9 presents an illustration of a scenario 900 involving a further example embodiments of the techniques presented herein, including a content provider server 410 that coordinates with a device set 502 to present content to a user 120. In this scenario 900, the content provider server 410 includes a content store 902 comprising at least one content item 406 having a set of content properties 506, while the respective devices 110 of the device set 502 also include a processor 210 and a memory 202 storing a set of device properties 504 of the device 110. The content provider server 410 responds to a content request, initiated through a current device 602 of the device set 502, to present the content item 406 using at least one device 110 of the device set 502.

The content provider server 410 may comprise a processor 210 and a memory 202 (e.g., a hard disk drive, a solid-state storage device such as a flash memory device, or a magnetic or optical disc) storing instructions that provide the components of an example system 904 that causes the content provider server 410 to operate according to the techniques presented herein. In particular, the system 904 of the content provider server 410 includes a property comparer 906, which receives, from the respective devices 110 of the device set 502, a description of the device properties 504 of the device 110. The example system 904 also includes a recommended device identifier 908, which, based upon the comparison performed by the property comparer 906, identifies a recommended device 612 for presenting the content item 406 to the user 112 of the device set 502. The example system 904 also includes a recommendation presenter 910, which transmits to at least one device 110 of the device set 502, for presentation to the user 112, a recommendation to use the recommended device 612 to view the content item 406. In a further embodiment (not shown), the content provider server 410 may transmit the content item 406 to the recommended device 612 (e.g., upon identifying the recommended device 612 of the device set 502; upon receiving an acceptance from the user 112 to use the recommended device 612; and/or upon receiving from the user 112 a further request to present the content item 406 on the recommended device 612). In this manner, the content provider server 410 facilitates the presentation of the content item 406 to the user 112 through the device set 502 in accordance with the techniques presented herein.

Figure 10:
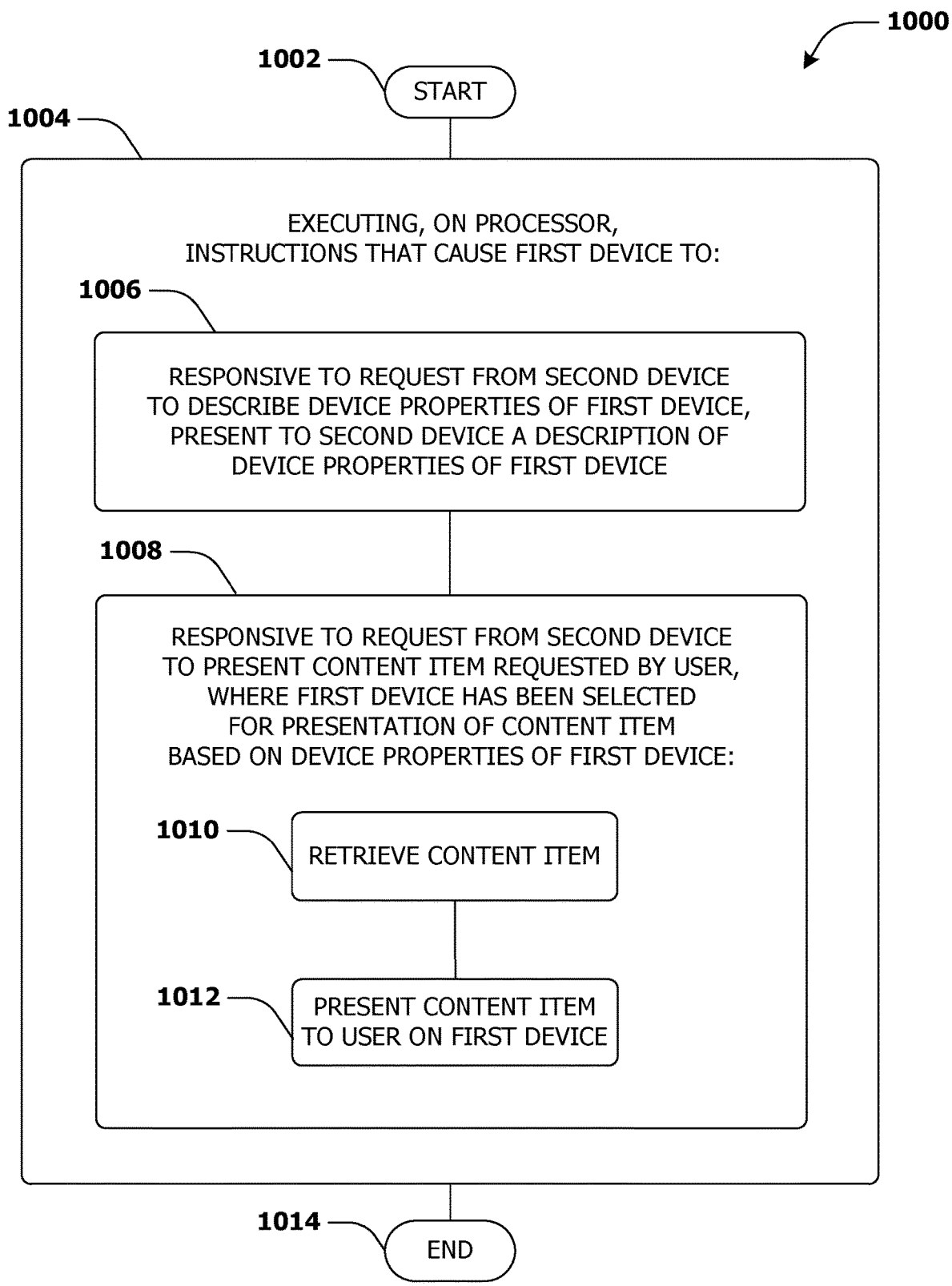
FIG. 10 is an illustration of a third example method of presenting content to a user of a device set, in accordance with the techniques presented herein.

FIG. 10 presents an illustration of a third example embodiment of the techniques presented herein, illustrated as an example method 1000 of presenting content to a user 112 of a device set 502 comprising, at least, a first device 110 and a second device 110. The example method 1000 may be implemented, e.g., as instructions stored in a memory (e.g., a hard disk drive, a solid-state storage device such as a flash memory device, or a magnetic or optical disc) that, when executed on a processor of a first device 110 of the device set 502, cause the device 110 to operate according to at least a portion of the techniques presented herein.

The example method 1000 begins at 1002 and comprises executing the instructions on the processor of the first device 110. Specifically, executing the instructions causes the first device 110 to, responsive to a request from the second device 110 to describe the device properties 504 of the first device 110, present 1006 to the second device 110 a description of the device properties 504 of the first device 110. Executing the instructions also causes the first device 110 to respond 1008 to a request from the second device 110 to present a content item 406 requested by the user 112, where the first device 110 has been selected as the recommended device 612 of the device set 502 for a presentation of the content item 406 based on the device properties 504 of the first device 110. Such response 108 of the first device 110 includes retrieving 1010 the content item 406, and presenting 1012 the content item 406 to the user 112 on the first device 110. In this manner, the example method 1000 causes the first device 110 to facilitate the presentation of content to the user 112 of the device set 502 in accordance with the techniques presented herein, and so ends at 1014.

Figure 11:
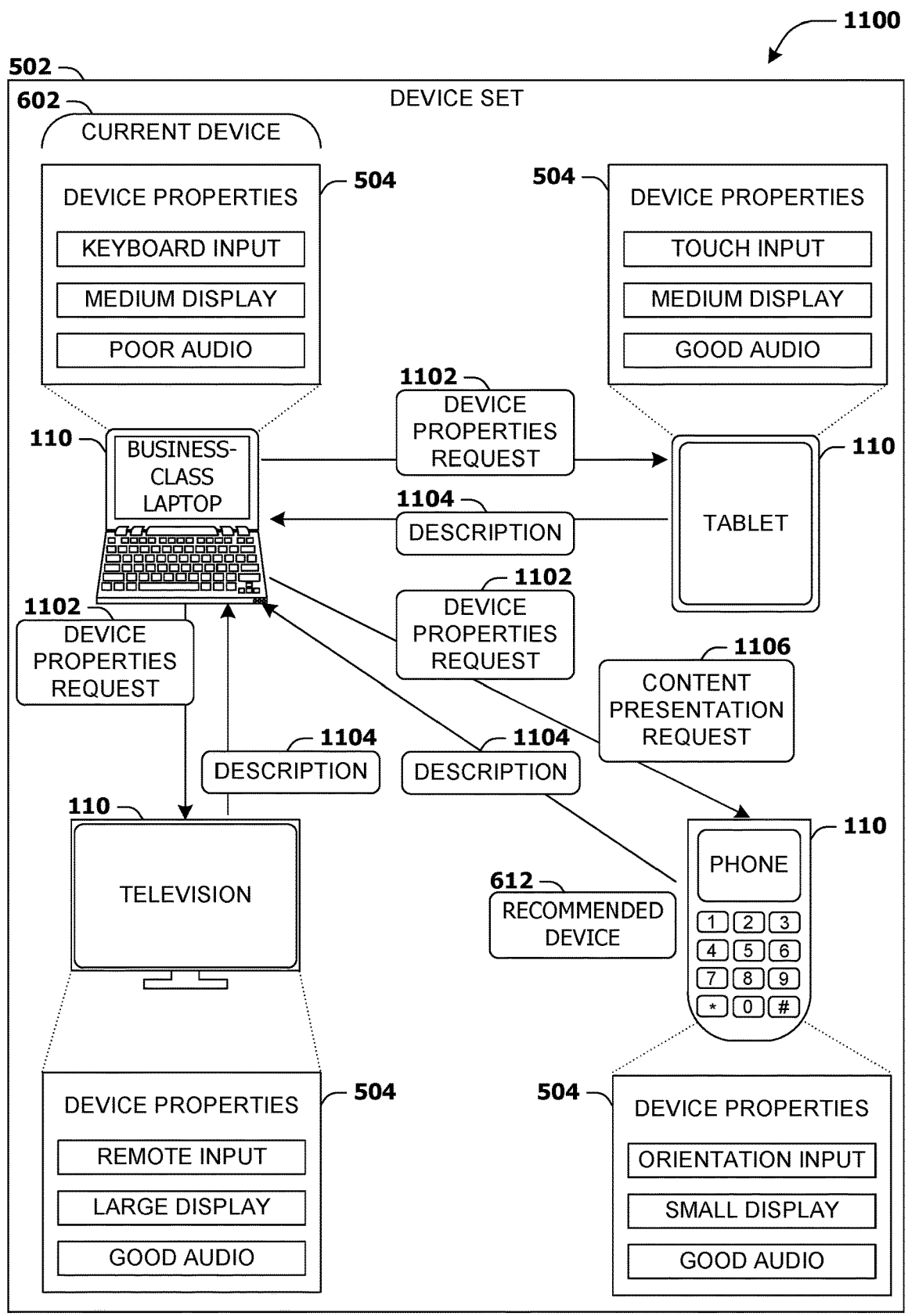
FIG. 11 is an illustration of a scenario featuring an example device set that interoperates to present content to a user, in accordance with the techniques presented herein.

FIG. 11 presents an illustration of a scenario 1100 involving a device set 502 of devices 110 that interoperate to present content to a user 112. The respective devices 110 of the client set 502 may comprise a processor 210, and a memory 202 (e.g., a hard disk drive, a solid-state storage device such as a flash memory device, or a magnetic or optical disc) storing instructions that provide the components of an example system that causes the device 110 to operate according to the techniques presented herein.

In this example scenario 1100, a device 110 that the user 112 is currently utilizing receives a request to present a content item 406. The device 110 may examine its device properties 504, and may also collect descriptions 1104 of the device properties 504 of the other devices 110 of the device set 502, in order to determine a recommended device 612 for the presentation of the content item 406. The current device 602 may then contact the respective other devices 110 of the device set 502 with a device properties request 1102, and the respective devices 110 may provide a description 1104 of the device properties 504. The current device 602 may then compare the descriptions 1104 of the device properties 504 of the respective devices 110, and the device properties 504 of the current device 602, with the content properties 506 of the content item 406, in order to identify the recommended device 612 for presenting the content item 406. If the recommended device 612 is identified as the current device 602, the current device 602 may proceed with presenting the content item 406 as requested. However, if the current device 602 identifies another device 110 as the recommended device 612 (such as the mobile phone device 110 in this example scenario 1100), the current device 602 may present a recommendation 614 to the user 112 to use the recommended device 612 for the presentation of the content item 406. If the user 112 accepts the recommendation 614, the current device 602 may transmit to the recommended device 612 a content presentation request 1106 that requests the recommended device 612 to present the content item 406. The content presentation request 1106 transmitted to the recommended device 612 may include either the content item 406 to be presented, or a reference identifying the content item 406, such as a Uniform Resource Identifier (URI) identifying the location of the content item 406, or a unique identifier of a particular content item 406 in a library of accessible content. The recommended device 612 may receive the content presentation request 1106, and may promptly retrieve and present the content item 406; may retrieve and store the content item 406 for later presentation to the user 112; and/or may simply store a reference or identifier to the requested content item 406 for later use. In this manner, the devices 110 of the device set 502 may interoperate to present content to the user 112 in accordance with the techniques presented herein.

Figure 12:
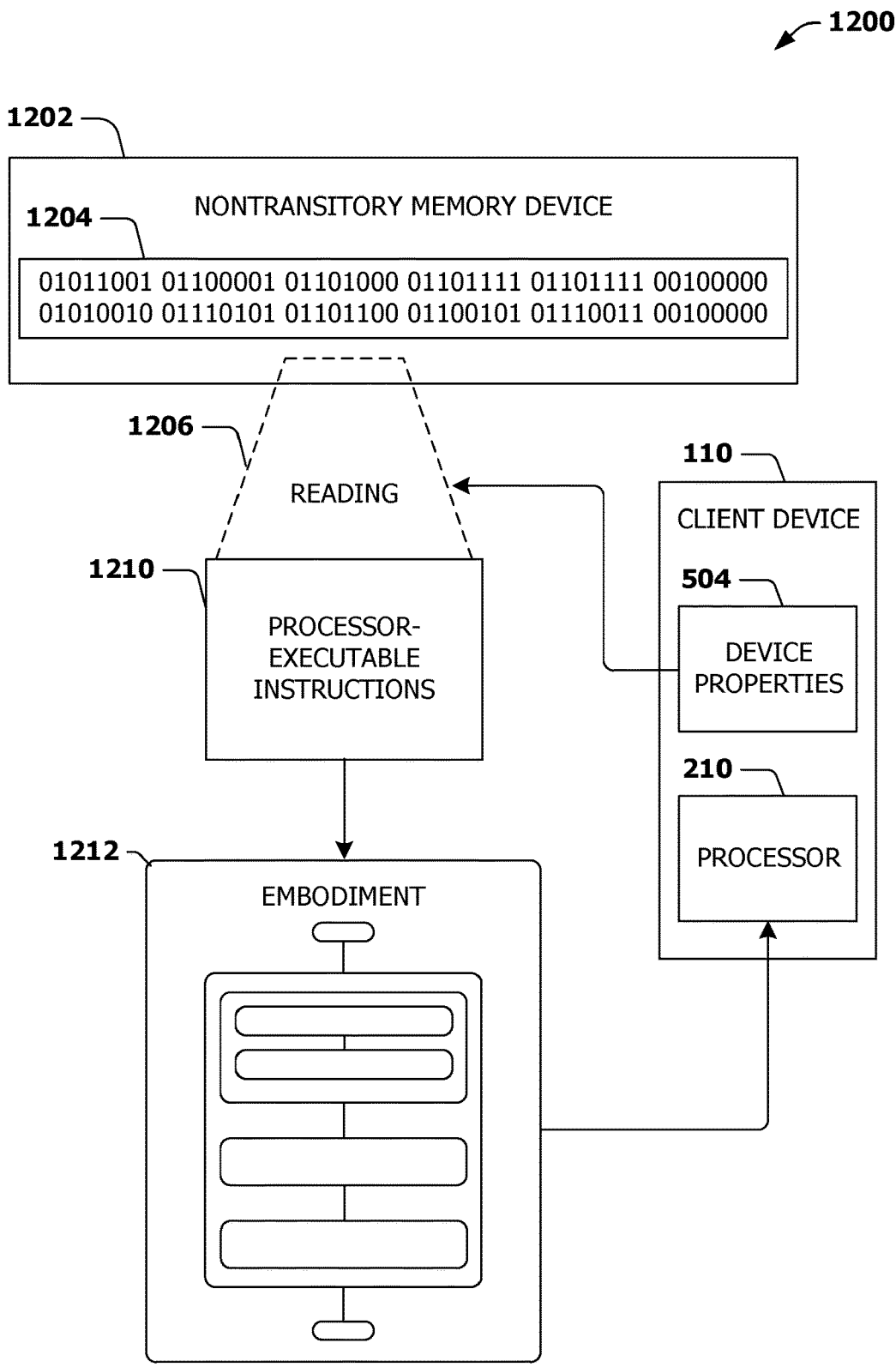
FIG. 12 is an illustration of a scenario featuring an example nontransitory memory device that causes a device to facilitate a presentation of content to a user of a device set, in accordance with the techniques presented herein.

FIG. 12 is an illustration of a scenario 1200 involving a sixth example embodiment of the techniques presented herein, comprising an example nontransitory memory device 1202, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1202 stores computer-readable data 1204 that, when subjected to reading 1206 by a reader of a device 1208 (e.g., a read head of a hard disk drive, or a read operation invoked on a solid-state storage device), express processor-executable instructions 1212. The processor-executable instructions 1212, when executed on a processor 1216 of the device 1208, cause the device 1208 to implement a method of presenting content to the user in accordance with the techniques presented herein, such as the example method 700 of FIG. 7; the example method 800 of FIG. 8; and/or the example method 1000 of FIG. 10. In another example, the computer-executable instructions may implement one or more components of a system, such as the content provider server 410 of FIG. 9, and/or the devices of the device set in the example scenario 900 of FIG. 9 and/or the example scenario 1100 of FIG. 11, such that when the instructions are executed on a processor of a device 110 and/or content provider server 410, implement the systems that cause such devices to operate in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 700 of FIG. 7; the example method 800 of FIG. 8; the example method 1000 of FIG. 10; the example content provider server 410 and/or the example devices 110 of FIG. 9; the example devices 110 of FIG. 11; and/or the example nontransitory memory device 1202 of FIG. 12) to confer individual and/or synergistic advantages upon such embodiments.

5.1. Scenarios

A first aspect that may vary among embodiments of the techniques presented herein involves the range of scenarios in which the techniques may be utilized.

As a first such example, the techniques presented herein may be utilized with a variety of devices 110, such as workstations, laptop and palmtop computers, mobile phones, tablets, game consoles, media players, appliances, wearable devices, and vehicle control systems. Such devices 110 may also be owned and/or administrated by the user 112, or may only be in temporary use by the user 112, such as a public display device that presents content to the user 112. The device 110 may also comprise a collection of such devices 110, such as a device "mesh" of devices that the user 112 utilizes together, including a wristwatch, a mobile phone, and a tablet. Additionally, such devices may be utilized on behalf of various types of users to fulfill requests to present content, such as an individual; a group of individuals using various devices 110 together, such as friends within a social network; and/or an individual presenting content to a group, such as an instructor of a classroom.

As a second such example, the techniques presented herein may be utilized with various types of content items 406 provided by various types of content services 404, such as text, images, videos, audio, data sets, and applications. Such content items 406 may also present various types of content, such as entertainment, news or informational material, educational or training content, and data or reference materials. Such content items 406 may also be personal to the user 112, such as a user's personal photo library or email and text messages; may be distributed publicly, such as images selected from a publicly accessible image library; or may be proprietary but purchased by the user, such as commercially available video and music. The techniques presented herein may also be provided by a variety of content services 402, such as freely available content services (e.g., a public library); proprietary, subscription-based content services (e.g., a subscription media library); and private content services (e.g., content provided exclusively for the user 112).

As a third such example, the techniques presented herein may be utilized with a variety of architectures. A first such architecture is presented in FIG. 9, where a content provider server 410 that receives a request to present a content item 406 from a current device 602; compares the content properties 506 of the requested content item 406 with the device properties 504 of the respective devices 602 of the device set 502 of the user 112 to determine a recommended device 612; and (if the recommended device 612 differs from the current device 602) transmits a recommendation to use the recommended device 612 for the presentation of the content item 406. A second such architecture is presented in FIG. 11, wherein the current device 602 of the device set 502 that receives the initial request to present the content item 406 collects descriptions 1104 of the device properties 504 of the other devices 110 of the device set 502 in order to determine the recommended device 612 to present the content item 406, and presents a recommendation 614 to the user 112 if the current device 602 differs from the recommended device 612.

Additional architectural variations of the techniques presented herein may also be utilized. For example, a current device 602 that receives a request to present a content item 406 may broadcast the request to the device set 502, and respective devices 110 may compare the device properties 504 of the respective device 110 with the content properties 506 of the content item 406 to determine whether or not the device 110 is a good candidate for serving as the recommended device 612 (e.g., whether the device 110 is compatible with the content item 406; whether the resources of the device 110 are sufficient for an adequate presentation of the content item 406; and/or how closely the device properties 504 match the content properties 506 of the content item 406). Devices for which the device properties 504 satisfy the content properties 506 may self-identify as good candidates may reply to the broadcast, and if two or more devices 110 so respond, a decision may be made (e.g., by negotiation, based on order of response, using a consensus mechanism such as Paxos, or simply choosing at random). In the manner of such examples, the techniques presented herein may be distributed over the devices 110 of the device set 502 and/or the content provider 408 of the content item 406 in various combinations, where each such combination fully utilizes the techniques presented herein.

5.2. Content Presentation Request

A second aspect that may vary among embodiments of the techniques presented herein involves the manner in which an embodiment receives a request to present content, which may be fulfilled in accordance with the techniques presented herein.

In some scenarios, the techniques presented herein may be utilized to fulfill a request initiated by the user 112 that directly specifies the content item 406 to be presented, e.g., by specifying a title of the content item 406 or a distinctive identifier such as the URL. The user 112 may also specify such selection according to a descriptive query that identifies one or more content items 406 (e.g., a request to play the songs in a music library by a particular artist). The user 112 may also specify such selection by selecting an item in a broader presentation of information, such as selecting a hyperlink in a web page that identifies a particular content item 406, including selecting a search result in a search result set that is presented responsive to a query.

In other scenarios, content items 406 may be selected for recommendation to the user 112 in the absence of a specific request by the user 112 to present content, wherein an acceptance of such a recommendation is interpreted as a request to present the recommended content item 406. Such recommendations may be based on a variety of factors.

As a first such example, content items may be selected according to information about the user 112, such as the user's interests and demographics retrieved from a user profile generated by the user 112; from the user's web browsing history; and/or the user's interaction with a service, such as purchase history through an e-commerce site.

As a second such example, content items may be selected for recommendation to the user 112 according to the user's current context, such as the user's current location or route, as detected by a global positioning system (GPS) receiver or navigation device; the user's current conversation topics, such as the contents of messages exchanged between the user 112 and other individuals; and the interaction of the user 112 with the user device 110, such as the user's current music playlist. For example, retrieving the content items 406 from the content server 404 may further comprise identifying a context indicator of a current context of the user 112 at the first time, and retrieving, through the content server 404, at least two content items 406 that match the current context of the user 112 at the first time.

As a third such example, additional signals may be utilized to select the content items 406 for presentation to the user 112, such as the static and/or trending popularity of topics within a population, such as the user's social network, or users within a geographic range of the user 112. Many such techniques may be utilized to select the content items 406 from the content store 802 of a content server 404, for recommendation to a user 112, in accordance with the techniques presented herein.

5.3. Determination of Device Set

A third aspect that may vary among embodiments of the presented techniques is the determination of the devices 110 comprising the device set 502.

In a first variation of this third aspect, a device 110 may have previously stored a list of the devices 110 comprising the device set 502. For example, the device 110 may have a preestablished awareness of the devices 110 comprising the device set 502, and may utilize such information to identify the recommended device 614. As another example, the device 110 may determine the composition of the device set 502 by retrieving a device set list from a source of information, such as a list of devices 110 that are associated with a user account of the user 112.

In a second variation of this third aspect, the device 110 may seek to discover the other devices 110 comprising the device set 502. For example, the device 110 may explore a local environment of the device 110 (e.g., by broadcasting an inquiry over the local area network (LAN), such as a WiFi network). Other devices 110 may respond to the broadcast to indicate their current inclusion in the device set 502, and/or to request inclusion and/or exclusion from the device set 502. Such techniques may also be utilized to develop the device set 502 in an ad-hoc manner (e.g., among the devices 110 utilized by students in a classroom, to identify the other devices 110 of the device set 502 that are suitable for the presentation of a content item 406.

Figure 13:
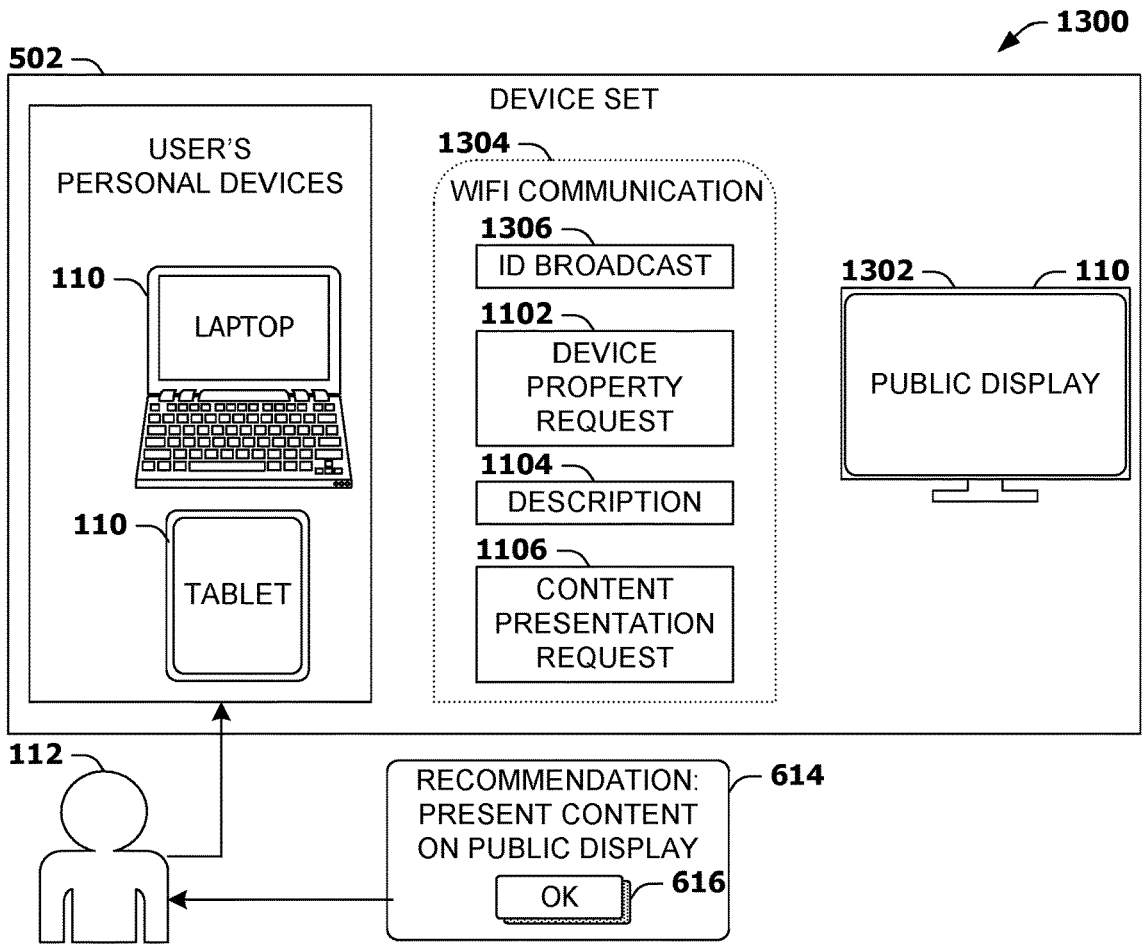
FIG. 13 is an illustration of a scenario featuring an identification of a device set for presenting a content item in accordance with the techniques presented herein.

FIG. 13 is an illustration of an example scenario 1300 featuring a third variation of this third aspect, where the device set 502 includes devices 110 that the user 112 does not own or maintain. In this scenario, responsive to detecting an availability of a public device that is available to present content items 406, the device set 502 may be extended to add the public device; and the comparison of device properties 504 of the current device 602, the device properties 504 of the public device, and the content properties 506 of the content item 406 may result in an identification of the public device as the recommended device 612 for presenting the content item 406.

In the example scenario 1300 of FIG. 13, a user operates a set of personal devices upon which a requested content item may be presented 406. In addition to comparing the device properties 504 of these devices 110, an attempt may be made to discover other devices 110 that, although not part of the user's personal device set, are available for the presentation of a content item 406. One or more of the user's personal devices 110 may listen over a WiFi network 1304, and may receive an ID broadcast 1306 by a nearby public display device 1302. The ID broadcast 1306 may represent an offer by the public display device 1302 to present content at the request of members of the public, such as a publicly accessible projector or billboard. Accordingly, personal device 110 of the user 112 may issue a device property request 1102, and the public display device 1302 may respond with a description 1104 of the device properties 504 of the public display device 1302. If the public display device 1302 is selected as the recommended device 612 to present the content item 406, a recommendation 614 may be presented to the user 112 to utilize the public display device 1302 to present the content item 406. If the user 112 accepts the recommendation 614 (e.g., by selecting an OK option 616), a device 110 of the user 112 may issue a content presentation request 1106 to the public display device 1302 (representing an acceptance of the offer represented by the ID broadcast 1306), and the public display device 1302 may respond by retrieving and presenting the content item 406 on behalf of the user 112. In this manner, the public display device 1302 is included in the device set 502 of devices 110 that are compared to determine the recommended device 612 for the presentation of the content item 406.

The example scenario 1300 of FIG. 13 may also be varied in numerous ways. As a first example, such scenarios may also be utilized to include devices 110 that are available for public use only for particular types of content item 406; only for a limited time, or in exchange for a fee; and/or only to members of the public who demonstrate particular credentials, such as a certificate that identifies the individual 112 as a member of a particular community, company, or educational institution. As a second example, such scenarios may be utilized to include the personal devices 110 of other individuals, such as friends or colleagues of the user 112, and/or even the personal devices of other individuals with no significant connection to the user 112 (e.g., a display of a computing device that is currently idle while its primary user is away may be offered to present content items 406 of another nearby user 112). As a third such example, these scenarios may be applied in reverse; e.g., a public display device 1302 may host and/or suggest content items 406 that a user 112 may wish to view, and a comparison of the display properties 504 of the public display device 1302 and those of the user's personal devices 110 may enable a recommendation 614 of a recommended device 612 to present a selected content item 406 on one of the user's personal devices 110. Many such variations may be included in the detection of the device set 502 in order to present content to the user 112 in accordance with the techniques presented herein.

5.4. Using Device Properties and Content Properties to Identify Recommended Device A fourth aspect that may vary among embodiments of the techniques presented herein involves the use of the device properties 504 of the devices 110 and the content properties 506 of the content item 406 to identify the recommended device 612 for presenting the content item 406.

As a first variation of this fourth aspect, the device properties 504 may include numerous details of the hardware resources of the device 504 that may relate to the presentation of the content item 406. Such details may include, e.g., display characteristics of a display component, such as device type (e.g., a large-scale display such as a projector or billboard, desktop or laptop LCD, handheld display such as a tablet, or a wearable display such as a wristwatch or head-mounted device); physical dimensions including curvature; supported display modes such as resolution, color depth, and/or refresh rate; pixel density, dynamic range, luminosity, and/or backlighting characteristics. Such details may include, e.g., audio characteristics of an audio component, such as the volume range, resolution, frequency range, frequency response, presence or absence of adjustable equalization, and/or device type (e.g., headphones vs. speakers). Such details may include, e.g., input characteristics of an input device, such as pointing capabilities (e.g., analog stick, mouse, trackball, touchpad, touch-sensitivity, optical pointer, or gaze tracking); gesture recognition capabilities, including multi-touch recognition; analog vs. discrete input types (e.g., binary-state buttons vs. sliders or dials); and input latency. Such details may also include, e.g., the computational resources of the device 110, such as the number, speeds, cores, instruction sets, and related capabilities of processors such as general-purpose processors (CPUs), graphics processors (GPUs), and math and/or physics coprocessors; the capacity, speed, latency, read/write characteristics, and caching of available memory and/or storage; and/or the bandwidth, latency, reliability, and/or costs of networking resources.

As a second variation of this fourth aspect, the device properties 504 may include numerous details of the software resources of the device 504 that may relate to the presentation of the content item 406. Such details may include, e.g., the operating system utilized by the device; the software applications that are available to render content items 406, such as media players and the availability of media codecs; the computing environment in which such content items 406 are to be presented (e.g., a media mode that is suitable for presenting full-screen media, or a windowed mode that presents content concurrently with other information); the availability of media libraries wherein content 406 may be stored or accessed, such as a locally stored music library vs. a "cloud-based" library accessible over a network; and the accessibility of stored credentials upon which the presentation of content items 406 may depend, such as security certificates and/or user authenticating information such as an account identifier and/or password.

As a third variation of this fourth aspect, the device properties 504 may include information about the current state and/or configuration of the device 110, such as the current computational load and/or the anticipated computational load throughout the presentation of the content item 406; the number of other users 112 who are currently utilizing the device 110, and/or who are expected to be utilizing the device 110 during the presentation of the content item 406; and a current or projected network bandwidth (e.g., a device that currently has ample bandwidth to retrieve a content item 406, but that may experience limited bandwidth in the future, may be a suitable recommendation if the content item 406 is capable of being presently retrieved and stored for future presentation). Such configuration information may also include, e.g., accessibility modes applied to the device 110 (e.g., the use of a high-contrast visual mode may diminish the presentation quality of a more finely contrasted visual presentation of a content item 406). These properties may together comprise the device media presentation capabilities of the device 110, which may indicate the quality of the presentation of media content that is achievable by the device 110. In some variations, the device 110 may recommend changes in hardware, software, or configuration that may enhance the quality of the presentation of the content item 406 and/or promote the recommendation of the device 110 as the recommended device 612 (e.g., a change of display resolution, a retrieval of a higher-performance codec, or the enabling and/or disabling of an accessibility mode). The identification of the recommended device 612 may therefore include the identification of a recommended configuration of the recommended device 612 that is suitable for the content item 406 (e.g., the selectable display resolution of the device display that is closest to the native resolution of the content item 406). The recommendation 614 may therefore specify a recommended configuration for configuring the recommended device 612 for the presentation of the content item 406; and when the recommendation 614 is accepted, the recommended device 612 may apply the recommended configuration in order to present the content item 406.

As a fourth variation of this fourth aspect, the device properties 504 of a particular device 110 may be determined by querying the device 110, e.g., based upon the contents of a component registry of the device 110. Alternatively or additionally, the device properties 504 for a particular device 110 may be determined by examining a reference source, such as a database provided by a manufacturer of the device 110 that indicates the device properties 504. The device properties 504 for a particular device 110 may also be determined by testing, e.g., evaluating the performance of the device 110 with test or calibration data to verify a sufficiency of the device 110 for presenting the content item 406. Alternatively or additionally, during presentation of the content item 406 on a particular device 110, the device 110 may monitor the device properties 504 to detect an inadequacy of one or more device properties 504 relating to presenting the content item 406 (e.g., an unanticipated drop in frame rate while presenting a particular type of content item 406), and may use such detected information to adjust the recommendation 614 and/or update the device properties 504 of the device 110 to inform future determination of recommended device 612. For example, if the recommended device 612 exhibits diminished performance that reduces the presentation quality of a content item 406, the techniques presented herein may be utilized again to identify a second recommended device 612 to which the presentation of the content item 406 may be transferred.

As a fifth variation of this fourth aspect, the content properties 506 of the content item 406 may include a wide range of details. As a first such example, the content properties 506 may indicate one or more media components of the content item 406 (e.g., text, pictures, video, vocal speech, sound effects, music, and/or tactile feedback). As a second such example, the content properties 506 may include details about the logistic properties of one or more media components (e.g., for video content, the content properties 506 may include the video resolution, bit depth, frame rate, shape, color palette, contrast, length, media encoding format, and/or metadata such as time sequencing for the display of subtitles). Such logistic properties may also be specified at varying levels of detail or abstraction, such as specifying precise resolution characteristics of the content item 406, and/or specifying that the content item 406 features text, and may therefore be more desirably presented on devices 110 that are well-suited for text output, such as tablet devices 110 featuring electrophoretic ink ("electronic paper") displays. As a third such example, the content properties 506 may include details about the interactivity of the content item 406 (e.g., the types of input that the content item 406 accepts, such as text, directional control, pointeror cursor-based input, gesture support, and immersive content, such as 360-degree video that is suitable for presentation in virtual reality devices). As a fourth such example, the content properties 506 may include details about the topical content of the content item 406 (e.g., the topics to which the content item 406 relates; the date, time, and/or location of the presented content item 406; the producer of the content; the target audience for the content item 406; and/or restrictions on the time, place, or viewership of the content item 406, such as licensing information for commercial and/or private information). As a fifth such example, the content properties 506 of the content item 406 may be weighted or scored to indicate the significance to the presentation quality of the content item 406; e.g., for a content item 406 that primarily includes video, and secondarily includes audio, may the content properties 506 may indicate a greater significance for closely matching devices 110 with suitable display characteristics than for closely matching devices 110 with robust audio capabilities.

As a sixth variation of this fourth aspect, the comparison of the device properties 504 of the respective devices 110 with the content properties 506 of the content item 406 to identify the recommended device 612 may be achieved in various ways. As a first such example, some content properties 602 may be identified as mandatory, such that devices 110 featuring device properties 504 that are not compatible with the content properties 602 may be excluded from selection as the recommended device 612 (e.g., a mandatory minimum resolution of the device display, or a mandatory capability of rendering audio that excludes devices 110 with no audio output capability). As a second such example, the comparison may involve a weighing or scoring of the suitability of the of the respective content 506 of the content item 406 and the corresponding device properties 504 of the device 110. For example, it is recognized that the presentation quality of video tends to be diminished by resolution scaling. Accordingly, devices 110 featuring a display with a resolution that exactly matches the resolution of the content item 406 may be ranked as most highly recommended, and devices 110 featuring a display resolution that is close to the resolution of the content item 406 and therefore involve only modest scaling may be deemed more highly recommended than devices 110 featuring a display resolution that significantly differs from the resolution of the content item 406 and therefore involves significant scaling. Similarly, an interactive content item 406 may indicate the desirability of various input types that may affect the quality of the presentation; e.g., for a particular interactive content item 406 such as a game may indicate that devices 110 featuring pointer-based control such as a mouse are the most suitable recommended devices 612; that devices 110 featuring analog directional control such as a game controller are less suitable recommended devices 612; and that devices 110 featuring only keyboard or discrete directional input are unsuitable for presenting the content item 406.

These and other factors may be considered individually and/or in combination to identify the recommended device 612, e.g., as the device 110 having the highest score when comparing the device properties 504 with the corresponding content properties 506 of the content item 406. In some scenarios, the device having the highest score may be automatically selected as the recommended device 612 (particularly if only one such device 110 qualifies as suitable for presenting the content item 406, or if the scoring difference between the top device 110 and the other devices 110 of the device set 502 is significant). Alternatively or additionally, the comparison may result in the identification of a short list of top-ranked devices 110 of the device set 502. The list may be presented to the user 112 as options for the presentation of the content item 406, since the user 112 may prefer to choose the second- or third-ranked device 110 in the device set 502 for reasons that are personal to the user 112. Many such variations may be utilized in using the device properties 504 of the devices 110 and the content properties 506 of the content item 406 to identify the recommended device 612 in accordance with the techniques presented herein.

5.5. Multi-Device Presentation and Content Composition

A fifth aspect that may vary among embodiments of the presented techniques involves the composition of multiple devices 110 of the device set 502 to present a content item 406, and/or the composition of the content item 406 based upon the set of available devices 110.

As a first variation of this fifth aspect, in addition to considering the presentation of the content item 406 on each individual device 110 of the device set 502, the identification of the recommended device 612 may consider a combination of the device properties 504 of at least two devices of the device set 502, such as the current device 602 and a second device, with the content properties 506 of the content item 406. The recommended device 612 may then be identified as a combination of at least two such devices 110 operating in concert to present the content item 406.

Figure 14:
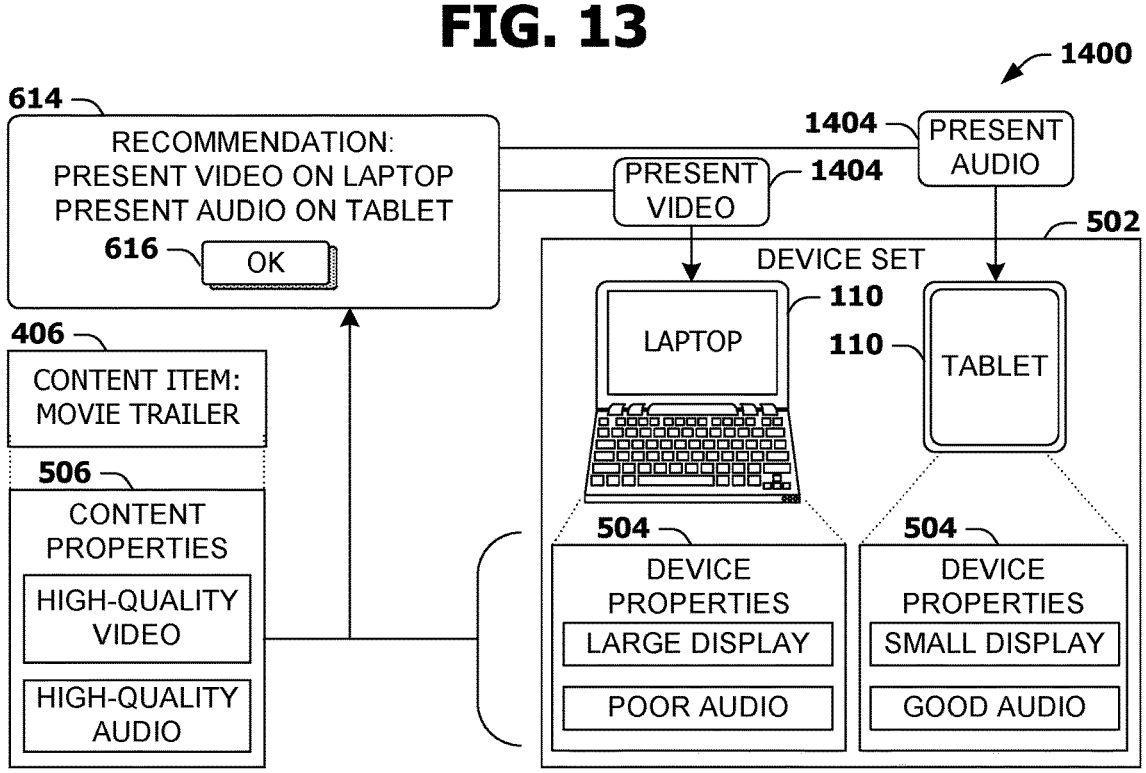
FIG. 14 is an illustration of a scenario featuring a composition of a device subset of a device set to present a content item in accordance with the techniques presented herein.

FIG. 14 is an illustration of an example scenario 1400 featuring one such combination of devices 110 as the recommended device 614. In this example scenario 1400, the device set 502 comprises two devices 110: a laptop device 110 (as the current device 602 through which a request to present a content item 406 is initiated), and a tablet device 110. The comparison of the device properties 504 and the content properties 506 may include a consideration of using both devices 110 together to present the content item 406. For example, the laptop device 110 may feature a large display that is suitable for the content item 406, but poor-quality audio output, while the tablet device 110 exhibits a comparatively small display but good audio components. A request to present content item 406 featuring both high-quality video and high-quality audio may therefore prompt a recommendation 614, as the recommended device 612, of presenting the video component of the content item 406 using the display of the laptop device, and the audio component of the content item 406 using the audio components of the tablet device 110. If the user 112 selects an option 616 indicating acceptance of the recommendation 614, the laptop device 110 (as the current device 602) may initiate a request to the tablet device 110 to present 1404 only the audio component of the content item 406, while also initiating a presenting 1404 on the laptop device 110 of only the video component of the content item 406. Further interoperation of the laptop device 110 and the tablet device 110 may be performed to maintain synchrony of the audio and video components during presentation of the content item 406 (e.g., verifying consistent chronology of the presentation of each component, and/or a user-requested pausing, skipping, and resuming of the presentation of the content item 406).

Many additional scenarios may result in a recommendation 614 of using a combination of devices 110 to render the content item 406. As a first such example, a content item 406 that includes stereophonic audio may utilize a combination of two devices 110 with audio output capabilities—one positioned to the user's left, and one positioned to the user's right—which may expand the positional range of the stereophonic presentation. As a second such example, different users 112 may participate in a multi-user presentation by using different devices 110 to view different portions of video of the content item 406, and/or different input components that enable multi-user interaction with the content item 406.

As a second variation of this fifth aspect, the content item 406 may be composed as a set of content components selected and distributed over the device set 406. For example, responsive to identifying a combination of at least two devices 110 as the recommended device 612, an embodiment may distribute the presentation of the content item 406 over the devices 110, and present the content item 406 in a manner that is distributed over the combination of the devices 110. For respective content portions of the content item 406, a device 110 may be chosen from a selected combination of devices 110 to present the content portion, and the content item 406 may be distributed over the combination of devices 110 by presenting the respective content portions, on the selected device 110 of the combination. That is, alternatively or additionally to choosing a combination of devices 110 for the content item 406, the content item 406 may feature a set of content components that may be selected in view of the available devices 110 and device properties 504, and may be composed over the combination of devices 110.

Figure 15:
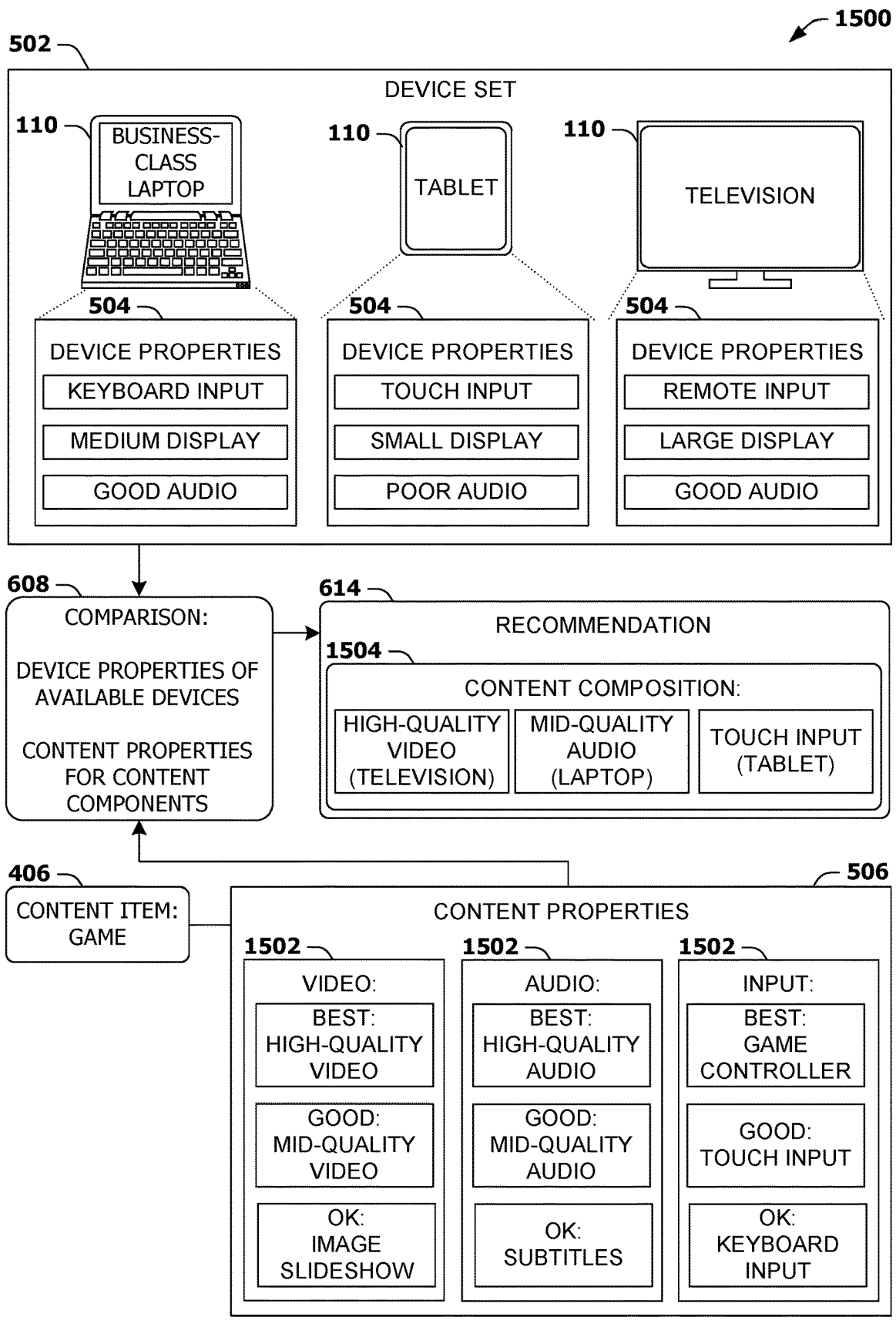
FIG. 15 is an illustration of a scenario featuring a composition of a content item for presentation using a device set in accordance with the techniques presented herein.

FIG. 15 is an illustration of an example scenario 1500 featuring a composition of a content item 406 over a device set 502. In this example scenario 1500, the device set 502 comprises three devices, each having a set of device properties 504. The content item 406 (e.g., a game) may exhibit, as content properties 506, a set of content components 1502, such as a video component 1502, an audio component 1502, and an input component 1502. For the respective content components 1502, a set of presentations may be included that may be selected for the content component 1502 based on the available devices. For example, a content item 406 may include a high-quality video presentation, a mid-quality video presentation, and a slideshow presentation. The audio component 1502 may similarly include a high-quality audio presentation, a mid-quality audio presentation, and a set of subtitles. In addition to choosing the respective device 110 for each content component 1502 of the content item 406, the content item 406 may itself be composed by selecting, among the presentations for the respective content components 1502, a particular presentation of the content component 1502 that is presentable by the combination of devices 110. For example, for the video component 1502 of the content item 406, the high-quality presentation may be selected specifically because the television device 110 is capable of presenting high-quality video. However, for the audio component 1502 of the content item 406, the high-quality presentation may be excluded because no device 110 of the device set 502 is capable of rendering high-quality audio; instead, the mid-quality audio presentation may be selected for the audio component 1502 and delegated to one of the two devices 110 that are capable of presenting mid-quality audio. In this manner, the content item 406 may be composed based upon the device set of devices 110, alternatively or additionally to choosing a combination of devices 110 to present the content item 406, in accordance with the techniques presented herein.

As further examples of this second variation of this fifth aspect, the composition of the content item 406 over the device set 502 may be achieved in many ways. As a first such example, and as illustrated in FIG. 15, the content item 406 may comprise at least two content item presentations that are respectively adapted for a set of device properties 504, and presenting the content item 406 on the recommended device 612 may involve selecting, among the two content item presentations for the respective content components 1502, a selected content item presentation that is adapted for the device properties 504 of the recommended device 612, and presenting the selected content item presentation for the content component 1502 of the content item 406 on the recommended device 612 (including on a selected device 110 of a device combination). As a second such example, the various content presentations of a particular content component 1502 may represent alternative formatting of the same content (e.g., the same video encoded at different resolutions, or the same dialogue relayed via spoken audio or subtitles), and/or may represent different content (e.g., a game may feature a puzzle element that is presented as a touch-based interactive puzzle if the device set 502 includes at least one device 110 with touch input, or that is presented as a text-based interactive puzzle if the device set 502 includes at least one device 110 with text entry capabilities). As a third such example, the use of such techniques together may occur consecutively (e.g., first choosing a combination of devices 110 from the device set 502 and then choosing presentations of the content components 1502 of the content item 406 to suit the combination of devices 110, or vice versa) or concurrently (e.g., choosing the combination of devices 110 while also choosing the presentations of the content components 1502 therefor). Many such techniques may be utilized to select a combination of devices 110 as the recommended device 612 for a content item 406, and/or to compose the content item 406 as a a set of presentations of various content components 1502 for the recommended device 612, in accordance with the techniques presented herein.

5.6. Contextually Sensitive Content Presentation

A sixth aspect that may vary among embodiments of the techniques presented herein involves choosing a device 110 of the device set 502 (or a combination thereof) as the recommended device 612 for presenting a content item 406 based, at least in part, on contextual factors of the devices 110, the content item 406, and the user 112.

As a first variation of this sixth aspect, the user 112 may be associated with at least two user roles, such as a student role, a professional role, a social role, and a personal role, in which the user 112 performs various activities that relate to a current role of the user 112. Additionally, respective devices 110 of the device set 502 may be further associated with at least one role of the user 112 (e.g., a professional device 110 that the user 112 only utilizes in performing professional tasks, and an academic device 110 that the user 112 only uses for academic tasks, such as reading or studying). When fulfilling a request to present a content item 406 in such scenarios, the recommended device 612 may be identified for the content item 406 by identifying, for the content item 406, a selected role of the user 112 for viewing the content item 406 (e.g., whether the user 112 typically and/or properly views the content item 406 only when occupying a particular role of a role set of the user 112). Selecting the recommended device 612 for viewing a particular content item 406 may therefore involve matching the contextual role associated with the content item 406 and the contextual role in which the user 112 utilizes the device 110 of the device set 502.

As a second variation of this sixth aspect, the content item 406 may be associated with a selected privacy level, such as information that is sensitive and personal to the user 112, or information that is proprietary to the user's professional work. Additionally, the respective devices 110 of the device set 502 may be associated with a privacy level in which the user 112 typically interacts with the device 110. For example, mobile devices 110 and portable computing devices 110 may be recognized as devices 110 that the user 112 often uses in public, such that presenting sensitive information (e.g., medical records or communications intended to be private) in a possibly public setting may violate the user's privacy. On the other hand, a television may be recognized as a device 110 that the user 112 typically uses in the privacy of a home, and therefore suitable for presenting private personal information; and a business-class workstation may be recognized as a device 110 that the user 112 utilizes in a closed professional environment, and therefore suitable for presenting proprietary information related to the user's profession (but unsuitable for presenting the user's private, personal information). Accordingly, when the user 112 requests to view a content item 406, the selected privacy level of the content of the content item 406 may be compared with the privacy levels associated with the respective devices 110, and the recommended device 612 may be selected that matches the selected privacy level associated with the content item 406.

Figure 16:
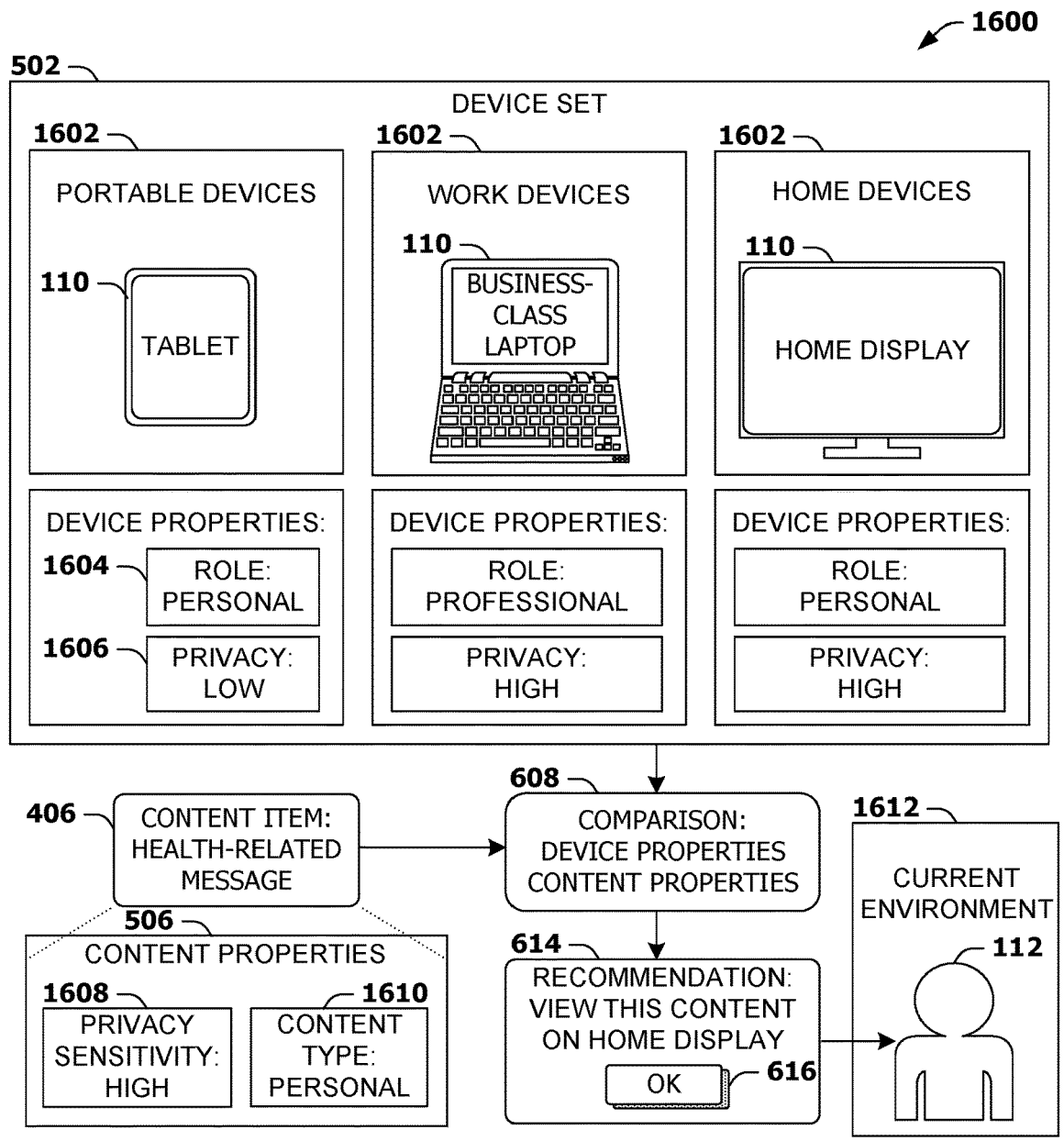
FIG. 16 is an illustration of a scenario featuring a recommendation of a device of a device set for presenting a content item in accordance with the techniques presented herein.

FIG. 16 is an illustration of an example scenario 1600 featuring the consideration of contextual factors in the selection of a recommended device 612 of a device set 502 to present a particular content item 406. In this example scenario 1600, respective devices 110 are characterized according to a device type 1602, which connotes a role 1604 in which the user 112 typically interacts with the device 110, and/or a privacy level 1606 of the device 110 based on its typical usage by the user 112. Similarly, the content properties 506 for a particular content item 406 may indicate the selected privacy level 1608 of the content of the content item 406, and also a content type 1610 that indicates a particular role in which the user 112 may wish to view the content item 406. The comparison 608 of the device properties 504 of the devices 110 and the content properties 506 of the content item 406 may enable a recommendation 614 of a recommended device 612 with a role 1604 that matches the content type 1610 of the content item 406, and/or a privacy level 1606 that matches the selected privacy level 1608 of the content item 406. In the example scenario 1600 of FIG. 16, the content item 406 presents health-related information which is private to the user 112, and related to the user's role 1604. From the device set 602, the comparison 608 may therefore exclude both a work-related device 110 (which, while private, is not suitable for viewing personal information) and a portable device 110 (which, while personal to the user 112, is not suitable for presenting private information), and may instead produce a recommendation 614 to use the home television device 110, which is both private and personal to the user 112. In this manner, the device set 502 may be utilized to adapt the presentation of the content item 406 based in part upon contextual factors of both the devices 110 and the content item 406 in accordance with the techniques presented herein.

As a third variation of this sixth aspect, alternatively or additionally to generally classifying the usage of the respective devices 110, the contextual device properties of the respective devices 110 may be adapted based on the current environment 1612 of the user 112 while interacting with such devices 110. In such scenarios, respective devices 110 of the device set 502 are further associated with a device environment 1612, the recommendation may involve detecting a current environment 1612 of the user 112; identifying, for the content item 406, a content environment 1612 for viewing the content item 406 (e.g., the type of environment 1612 in which the user 112 may wish to receive the information); and identifying, as the recommended device 612, a device 110 that is currently associated with a device environment 1612 that matches the current environment 1612 of the user 112 and/or the content environment 1612 of the content item 406. Such information may be inferred by evaluating a variety of signals that are accessible to the current device 602 and the device set 502 (e.g., the user's current location; the locations of the user's devices 110; and the other types of content that the user 112 is currently using) in order to determine the context associated with the user's current environment 1612. In this manner, the comparison of the content properties 506 of the content item 406 and the device properties 504 of the devices 110 may further include evaluating the environmental context of the user 112 and/or the device 110 in order to identify a recommended device 612 that contextually matches the environment 1612 of the content item 406 with the current environment 1612 of the user 112.

For example, a content item 406 may present information that relates to the user's social connections, such as social media from the user's social network. However, even while the user is interacting with a device 110 that is suitable for viewing social content, the user 112 may wish to avoid viewing such content while located in a professional environment (e.g., while the user 112 is interacting with a personal mobile phone but is located in an office) and/or functioning in a professional context (e.g., while in the company of professional colleagues). Conversely, even if the user 112 is in a location that is contextually suitable for the content (e.g., while the user 112 is at home), the user 112 may wish to avoid viewing such content while utilizing a device in a manner that is associated with a professional context (e.g., while engaging in professional work). In such cases, the identification of a recommended device 612 may include a recommendation to defer the viewing of the content item 406 for presentation on a recommended device 110 that more closely matches the suitable environment of the content item 406. Many such techniques may be utilized to include contextual cues of the content item 406, the user 112, and the devices of the device set 110 while identifying a recommendation 614 of a recommended device 612 to view a particular content item 406 in accordance with the techniques presented herein.

5.7. User Experience of Device Recommendation

A seventh aspect that may vary among embodiments of the techniques presented herein involves the user experience of presenting the recommendation 614 of the recommended device 612 to the user 112, and/or of transferring the presentation of the content item 406 to the recommended device 612 upon acceptance of the recommendation 614.

As a first variation of this seventh aspect, the recommendation 614 may be presented to the user 112 through a variety of user interfaces. As a first such example, the current device 602 through which the user 112 initiated the request for the content item 406 may display the recommendation 614 between the selection of the content item 406 and presenting the content item 406 to the user 112 (e.g., as an interstitial web page or dialog). As a second such example, the current device 602 may initiate the presentation of the content item 406, and, concurrently with the presentation of the content item 406, may present the recommendation 614 in a peripheral manner (e.g., as an annotation presented next to the presentation of the content item 406, or as a notification presented through a global notification system). As a third such example, even before the user 112 has selected a content item 406 for presentation, the current device 602 may determine a recommended device 612 for respective content items 406 that the user 112 might select (e.g., for each entry in a set of search results or a media library), and may annotate a list-style presentation of the content items 406 with an annotation indicating a recommendation 614 of a recommended device 612 for the presentation of the content item 406. Such annotation may guide the user 112 in the selection of the content items 406 presented for consideration (e.g., if the user 112 is primarily interested in viewing content in the current moment and with the current device 602, the annotation indicating a recommendation 614 of using a different recommended device 612 for presenting some content items 406 may enable the user to choose among the remaining entries for which the current device 602 is suitable). As a fourth such example, the current device 602 may present options 616 for selecting or declining a recommendation 614 in various ways, such as a pop-up dialog; an annotation of a content viewing user interface (e.g., the insertion or activation of a "transfer content" button); and/or a notification pane or list, which may be integrated with other device notifications and presented peripherally to the content. Such user interfaces may also respond in various ways. For example, transferring the presentation may be achieved by tapping or selecting an option 616 to transfer the presentation; by issuing a verbal "OK" or "yes"; or through a gesture, such as swiping a content item to the edge of a display of the current device 602 to transfer the presentation to the recommended device 612. Alternatively, declining the recommendation 614 may be achieved by tapping or selecting an option 616 to dismiss the recommendation 614; by tapping outside of the user interface option 616 to dismiss it; by issuing a verbal "no"; or simply by refraining from accepting the option 616 for a particular period of time.

As a second variation of this seventh aspect, some scenarios may automate the transfer of content rather than presenting an explicit recommendation, at the time of the content request. For example, a user may wish to view content (e.g., content of a particular type, such as videos) using a recommended device 612, such as a projector. The user may therefore indicate in advance that a recommended device 612 is to be used for such content requests. The current device 602 may store a record of such indication, and when the current device 602 receives a request to view content of the identified type, the current device 602 may automatically transfer the presentation of the content to the recommended device 612 without presenting an explicit recommendation 614 and/or awaiting an affirmative "OK" from the user 112. In this manner, the user experience may be further automated for the convenience of the user 112.

As a third variation of this seventh aspect, a variety of information may be included with the recommendation 614. As a first such example, the recommendation 614 may simply indicate the recommended device 612 for the content item 406, and allow the user 112 to make use of the provided information. Alternatively, the recommendation 614 may include options 616 for accepting and/or dismissing the recommendation 614, where acceptance results in a transfer of the presentation of the content item 406 to the recommended device 612. As a second such example, the recommendation 614 may include information about the rationale of the recommendation 614, e.g., the relative advantages of using the recommended device 614 for the presentation of the content item 406 instead of the current device 602, such as a more efficient energy usage and battery life when rendering the content item 406 on the recommended device 614. As a third such example, the recommendation 614 may include information about configuring the recommended device 614 for presenting the content item 406; e.g., when a combination of devices 110 is presented as the recommended device, the recommendation 614 may describe where to position the respective devices 110 for the presentation of the content item 406.

As a fourth variation of this seventh aspect, in addition to the recommended device 612, the recommendation 614 may present additional suggestions related to the request to present the content item 406. As a first such example, in some scenarios, it may be determined that no device 110 or combination of devices 110 is available in the device set 502 to achieve the highest-quality presentation of the content item 406. Accordingly, the comparison of the devices 110 for the presentation of the content item 406 may include a consideration of a third device that is not included in the device set 110, such as an input device that is particularly well-suited for the content item 406. If the third device 110 is recognized as exceeding the quality of the devices 110 in the current device set 502, the recommendation 615 may include a suggestion to the user 112 for an acquisition of the third device for the presentation of the content item 406 (e.g., "the audio in this presentation is optimized for headphones"). In some cases, the user 112 may already own or have access to such a third device, and may add it to the device set 502 for future presentations of such content items 406 (optionally including a reevaluation of the device set 502 once the third device is added). In other cases, the suggestion may prompt the user 112 to acquire the third device or access thereto, in order to view the content item 406 in the recommended manner. As a second such example, the evaluation of the device set 502 in the context of presenting the content item 406 may prompt the identification of a second content item 406 that is related to the content item 406, and a presentation to the user 112 of a content recommendation for the second content item 406. For example, if the content item 406 comprises a 360-degree virtual-reality simulation and the device set 502 is determined to include the capabilities of presenting such content, other virtual-reality simulations that utilize the same devices 110 or combinations thereof may be suggested to the user 112 (optionally at the conclusion of the presentation of the requested content item 406).

As a fifth variation of this seventh aspect, in some scenarios, the opportunity to transfer the content item 406 to a recommended device 612 may arise during the presentation of the content item 406 on the current device 602. As a first such example, a user 112 may be viewing a video on a mobile phone while traveling, during which the mobile phone may be the recommended device 612 of the device set 502; however, upon arriving home, the user 112 may now have access to additional devices 110, such as a television, that present opportunities for a superior presentation. As a second such example, an initial recommendation 614 of a first recommended device 612 may be based upon a projected performance of the first recommended device 612 in the presentation of the content item 406. However, the recommended device 612 may exhibit diminished performance during the presentation of the content item 406 (e.g., due to a reduction or loss of bandwidth, processing cycles, memory, or stored power). Such loss of performance may be detected as an inadequacy of the observed device properties 504 of the device 110 during the presentation of the content item 406, which may prompt the identification of a second device as an updated recommended device 612 for viewing the content item 406, to which the presentation of the content item 406 may be transferred from the first recommended device 612 in order to continue the presentation in a more satisfactory manner.

In such circumstances, the detection of a recommended device 612 other than the current device 110 may result in a presentation of an updated recommendation 614. However, if the recommendation 614 is presented promptly upon identifying the second recommended device 612, such presentation may interrupt the actual presentation of the content item 406 on the current device (e.g., blocking or stopping the presentation of video), which may frustrate the user 112. Additionally, the user 112 may be irritated by the transfer of the presentation of the content item 406 from the current device 602 to a preferred device 612 (e.g., having to change locations in a house to the room with the television). Instead, the current device 602 may choose the timing of the presentation and/or transfer of the presentation in manner that is more suitable with the current presentation of the content item 406 on the current device 602. As one such example, the recommendation 614 may be presented by monitoring the presentation of the content item 406 to detect a pause in the presentation, either initiated by the user 112 (e.g., pressing a "pause" button) or integral with the presentation (e.g., between the scenes of a narrative content item 406, or during a "load time" of a game). During the detected pause in the presentation of the content item 406, the recommendation 614 may be presented to the user 112 as an option to transfer the presentation of the content item 406 to the updated recommended device 612.

Figure 17:
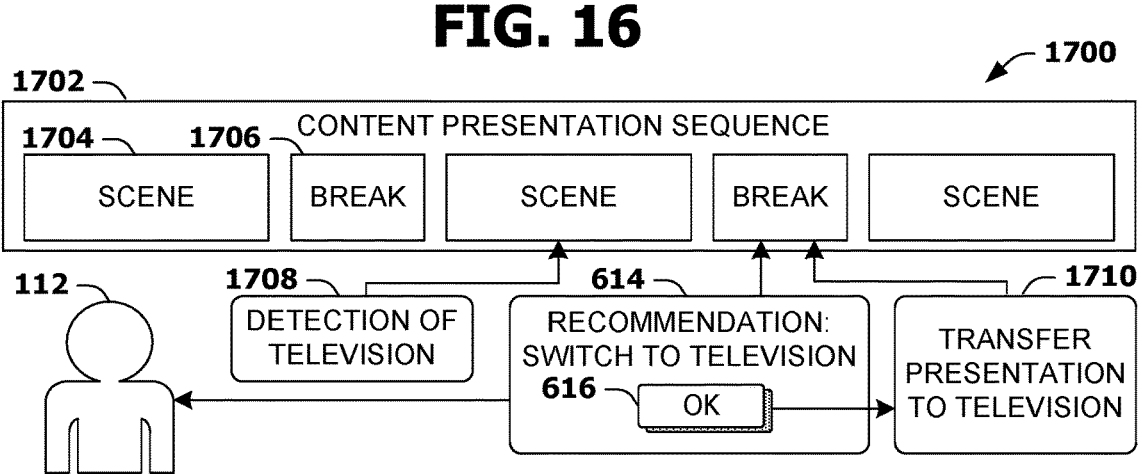
FIG. 17 is an illustration of a scenario featuring a presentation of a recommendation to transfer a content item to a recommended device in accordance with the techniques presented herein.

FIG. 17 is an illustration of an example scenario 1700 featuring one such technique for presenting a recommendation 614 to a user 112 during a presentation of a content item 406. In this example scenario 1700, the user 112 is using a current device 602 (such as a mobile tablet) to watch a content presentation sequence 1702 consisting of an alternating sequence of scenes 1704 and breaks 1706 (e.g., a scene transition, a brief pause between sections of a work, or an insertion point for a commercial). In the middle of one such scene 1704, a detection 1708 may occur of a recommended device 612 that is capable of a higher-quality presentation of the content item 406 than the current device 602. Rather than interrupting the scene 1704 to present the recommendation 614, the current device 602 may monitor the content presentation sequence 1702 to detect the occurrence of a break 1706 in the content presentation sequence 1702. At that time, the current device 602 may present to the user 112 the recommendation 614 to transfer the presentation to the recommended device 612; and upon a selection of the option 616 indicating an acceptance of the recommendation 614, a transfer 1710 may be initiated from the current device 602 to the recommended device 612. The recommended device 612 may resume the presentation of the content item 406 promptly and/or at the same position in the content presentation sequence 1702 (e.g., by commencing streaming at the beginning of the scene 1704 following the current break 1706). Also, concurrently or previous to resumption of the presentation, the recommended device 612 may retrieve and store the content item 406 (e.g., either in part beginning with the scene 1704 following the break 1706, or in whole). In this manner, the recommendation 614 to transfer the presentation of the content item 406 to the recommended device 612 may be achieved in a manner that reduces the interruption of the current presentation of the content item 406, in accordance with the techniques presented herein.

5.8. Device-Specific Content Lists

An eighth aspect that may vary among embodiments of the presented techniques involves the storage of device-specific content lists of content items 406 for which the device 110 comprises the recommended device 612 of the device set 502.

In some of the scenarios described herein, while a particular device 110 may be identified as the recommended device 612 for presenting a content item 406, it may not be possible or advisable to initiate the presentation of the content item 406 promptly upon acceptance of the recommendation 614. As a first such example, the recommended device 612 may not be in the vicinity of the user 112 (e.g., the user 112 may encounter an interesting content item 406 in transit that is well-presented on a home television device 110). As a second such example, the recommended device 612 may not be currently available for the presentation (e.g., the recommended device 612 may be occupied with other processing, such as the presentation of a different content item 406, or may comprise a portable device for which the battery has been exhausted). As a third such example, the current context of the presentation of the content item 406 may be unsuitable (e.g., due to the user's current location or role 1604, the privacy level 1606 of the recommended device 612 and/or the associated privacy 1608 of the content item 406, and/or the current environment 1612 of the user 112). While the user 112 may accept the recommendation 614 to present the content item 406 on the recommended device 612, the user 112 may forget to do so by the time the recommended device 612 is available and suitable to present the content item 406.

Accordingly, in some embodiments of the presented techniques, the acceptance of a recommendation 614 to use a recommended device 612 for the presentation of a content item 406, when such presentation cannot be achieved promptly, may result in the queuing of the requested content item 406 in a content list for the recommended device 612. That is, a device-specific list of content items 406 may be stored for the recommended device 612. When the user 112 is later able to access the recommended device 612, the recommended device 612 may present the list of content items 406 to the user 112 as a reminder of the content items 406 for which the user 112 opted to defer presentation.

Figure 18:
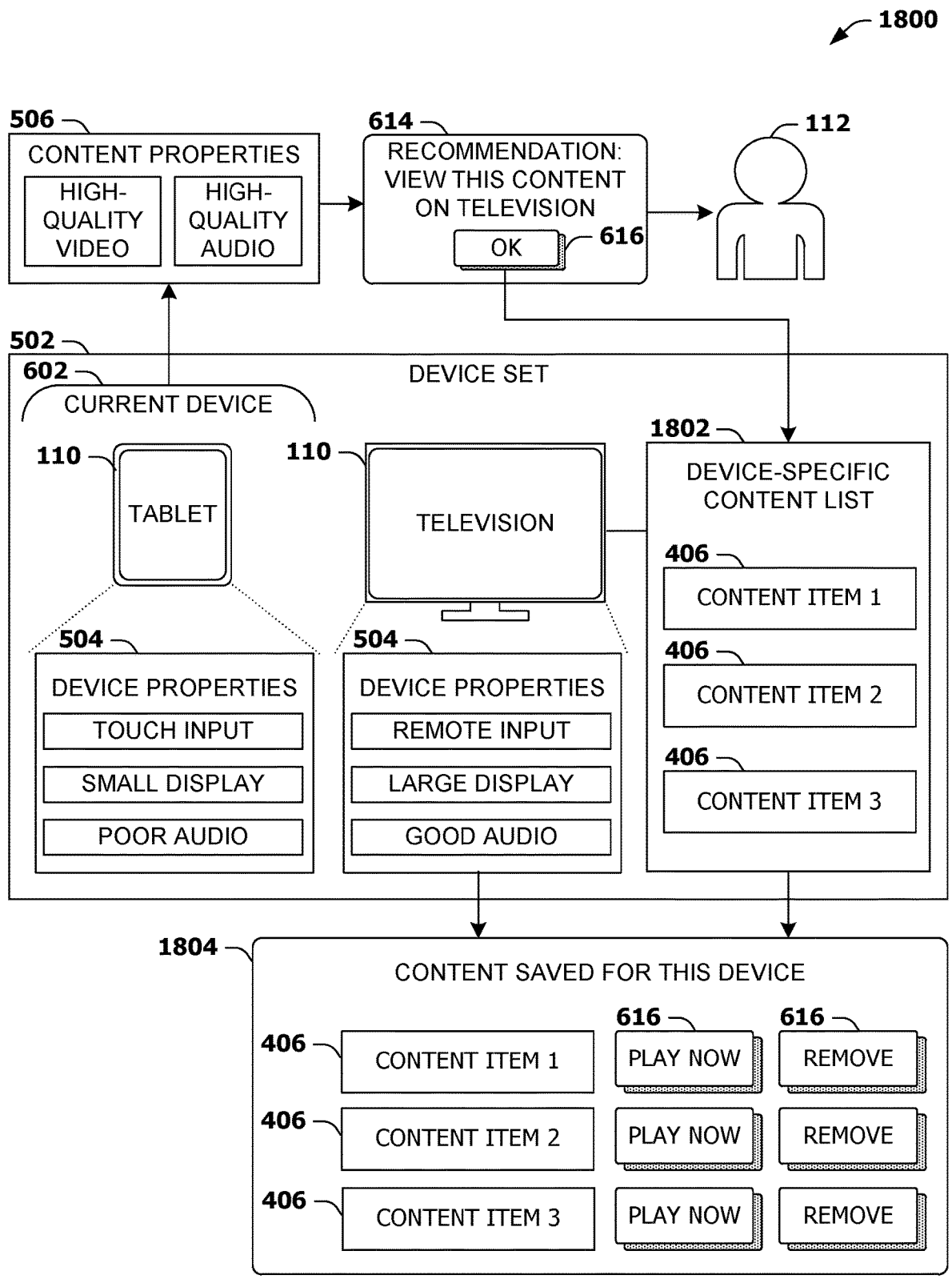
FIG. 18 is an illustration of a scenario featuring a device-specific content list to present content items in accordance with the techniques presented herein.

FIG. 18 is an illustration of an example scenario 1800 featuring a device-specific content list 1802 of content items 406 for a recommended device 110. In this example scenario 1800, the user 112 requests the presentation of a content item 406 on a current device 602, but a comparison of the content properties 506 of the current device 602 and those of a second device 110, such as a television, with the content properties 506 of the content item 406 produces an identification of the television 110 as the recommended device 612. A recommendation 614 may be presented to the user 112 to view the content item 406 on the recommended device 612, and the user 112 may choose the option 616 to accept the recommendation 614, but the user 112 may not currently be near the television 110. Instead, a reference to the content item 406 is stored in a device-specific content list 1802. When the user 112 is later in the vicinity of the recommended device 612 (e.g., upon the request of the user 112, and/or when the recommend device 612 detects the presence of the user 112), the recommended device 612 may display 1804 the contents of the device-specific content list 1802, with options 616 to play the respective content items 406, and/or to remove the content item 406 from the device-specific content list 1802. In this manner, the devices 110 of the device set 502 may track the choices of the user 112 as to which devices 110 to use for a deferred presentation of content items 406, and may assist the user 112 in remembering and viewing such deferred content items 406, in accordance with the techniques presented herein.

6. Usage of Terms

Although the subject matter has been described in language specific to structural features and/or methodological acts, the subject matter defined in the appended claims is not necessarily limited to the specific features or acts described above. Rather, the specific features and acts described above are disclosed as example implementations of the claims.

Although the disclosed subject matter has been shown and described with respect to one or more implementations, equivalent alterations and modifications may occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application.

The claimed subject matter may be implemented in various ways, such as a method, an apparatus, or an article of manufacture. Each such implementation may utilize standard programming and/or engineering techniques to produce software, firmware, hardware, or any combination thereof to control a computer to implement the disclosed subject matter. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used herein and unless specified otherwise or clear from context, terms such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense.

As used herein and unless specified otherwise or clear from context, the term "or" is intended to mean an inclusive "or" rather than an exclusive "or".

As used herein and unless specified otherwise or clear from context, the terms "a," "an," or "the" may convey either a singular usage or a plural usage.

As used herein and unless specified otherwise or clear from context, the terms "first," "second," etc. are not intended to imply a temporal aspect, a spatial aspect, an ordering, etc. Rather, such terms are merely used as identifiers, names, etc. for features, elements, items, etc. For example, the terms "a first object" and "a second object" generally correspond to object A and object B, or two different objects, or two identical objects, or the same object.

As used herein and unless specified otherwise or clear from context, the terms "includes", "having", "has", "with", and variants thereof are used in either the detailed description or the claims, such terms are intended to be inclusive in a manner similar to the term "comprising."

As used herein and unless specified otherwise or clear from context, the phrase "at least one of," such as "at least one of A and B," generally means A, or B, or both A and B.

As used herein and unless specified otherwise or clear from context, the term "example" is used herein to mean serving as an example, instance, illustration, etc., and not necessarily as advantageous. Any aspect or design described herein as "example" is not necessarily to be construed as advantageous over other aspects or designs. Rather, use of the word example is intended to present concepts in a concrete fashion.

As used herein and unless specified otherwise or clear from context, the term "based on" may be understood as not necessarily intended to convey an exclusive set of factors and may, instead, allow for existence of additional factors not necessarily expressly described, again, depending at least in part on context.

As used herein and unless specified otherwise or clear from context, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein and unless specified otherwise or clear from context, the term "article of manufacture" as used herein is intended to encompass a computer program accessible from any computer-readable device, carrier, or media.

The invention claimed is:

1. A method of presenting content to a user of a device set of devices, the method involving a current device comprising a processor, and the method comprising:
   executing, on the processor, instructions that cause the current device to:

responsive to a request by the user to view a content item:

compare device properties of the current device and device properties of a second device of the device set with content properties of the content item, wherein both the current device and the second device are compatible with the content item, wherein the device properties of the current device comprise a first type of input associated with the current device and an indication of a virtual reality capability associated with the current device, wherein the device properties of the second device comprise a second type of input associated with the second device, wherein the content properties of the content item comprise a third type of input associated with the content item and an indication of immersive content associated with the content item;

between the current device and the second device, identify a combination of the current device and the second device as a recommended device for the content item, wherein device properties of the combination of the current device and the second device more closely match the content properties of the content item than the device properties of the current device and the device properties of the second device, respectively; and responsive to identifying the combination of the current device and the second device as the recommended device:

present the content item distributed over the combination of the current device and the second device; and maintain synchrony of an audio component and a video component of the content item via interoperation between the current device and the second device.

2. The method of claim 1, wherein:
the device properties of the current device comprise a first type of display associated with the current device;
the device properties of the second device comprise a second type of display associated with the second device; and
the content properties of the content item comprise a type of content associated with the content item.

3. The method of claim 1, wherein:
the device properties of the current device comprise a first type of audio associated with the current device;
the device properties of the second device comprise a second type of audio associated with the second device; and
the content properties of the content item comprise a type of content associated with the content item.

4. The method of claim 1, wherein comparing the device properties of the current device with the content properties of the content item further comprises:
testing at least one device property of the current device to verify sufficiency of the current device for presenting the content item.

5. The method of claim 4, wherein identifying the combination of the current device and the second device as the recommended device further comprises:

during presentation of the content item on the current device, detecting an inadequacy of the at least one device property of the current device for presenting the content item; and responsive to detecting the inadequacy, recommending the combination of the current device and the second device as the recommended device.

6. The method of claim 1, wherein the content properties comprise at least one of:
a video resolution associated with the content item, a bit depth associated with the content item, a frame rate associated with the content item, a shape associated with the content item, a color palette associated with the content item, a contrast associated with the content item, a length associated with the content item, a media encoding format associated with the content item, or metadata associated with the content item.

7. The method of claim 1, wherein:
the device properties of the current device comprise a first type of display associated with the current device;
the device properties of the second device comprise a second type of display associated with the second device;
the content properties of the content item comprise a type of visual content associated with the content item;
the device properties of the current device comprise a first type of audio associated with the current device;
the device properties of the second device comprise a second type of audio associated with the second device; and
the content properties of the content item comprise a type of audio content associated with the content item.

8. The method of claim 1, wherein:
the second type of input is a remote input.

9. The method of claim 1, comprising:
responsive to the request by the user to view the content item:
listening over a network for one or more ID broadcasts associated with one or more devices available for presentation of the content item;
based on the listening, identifying a first ID broadcast from a display device, wherein the first ID broadcast is indicative of an offer by the display device to present content;
responsive to identifying the first ID broadcast, issuing a device property request to the display device;
receiving a description of one or more device properties of the display device; and
comparing the one or more device properties of the display device with the content properties of the content item.

10. The method of claim 1, wherein:
identifying the recommended device for the content item further comprises:
identifying a configuration of the recommended device for the presentation of the content item; and
executing the instructions further causes the current device to present, to the user, a configuration recommendation for configuring the recommended device for the presentation of the content item.

* * * * *